United States Patent

Park et al.

(10) Patent No.: US 9,822,778 B2
(45) Date of Patent: Nov. 21, 2017

(54) FAN ASSEMBLY

(71) Applicant: Dyson Technology Limited, Wiltshire (GB)

(72) Inventors: Charles Edward Park, Malmesbury (GB); Tom Vallance Hamilton Crawford, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 275 days.

(21) Appl. No.: 13/865,595

(22) Filed: Apr. 18, 2013

(65) Prior Publication Data

US 2013/0280099 A1 Oct. 24, 2013

(30) Foreign Application Priority Data

Apr. 19, 2012 (GB) .................................. 1206889.6

(51) Int. Cl.
*F04D 25/08* (2006.01)
*F04D 27/00* (2006.01)
(Continued)

(52) U.S. Cl.
CPC .............. *F04B 49/20* (2013.01); *F04D 25/08* (2013.01); *F04D 27/004* (2013.01); *F24F 7/007* (2013.01);
(Continued)

(58) Field of Classification Search
CPC .......... F04D 25/08; F04D 25/10; F04D 29/54; F04D 27/004; F04D 27/0261;
(Continued)

(56) References Cited

U.S. PATENT DOCUMENTS

| 284,962 A | 9/1883 | Huston |
|---|---|---|
| 1,357,261 A | 11/1920 | Svoboda |

(Continued)

FOREIGN PATENT DOCUMENTS

| BE | 560119 | 8/1957 |
|---|---|---|
| CA | 1055344 | 5/1979 |

(Continued)

OTHER PUBLICATIONS

Search Report dated Aug. 16, 2012, directed to GB Application No. 1206889.6; 1 page.

(Continued)

*Primary Examiner* — Devon Kramer
*Assistant Examiner* — Thomas Cash
(74) *Attorney, Agent, or Firm* — Morrison & Foerster LLP

(57) ABSTRACT

A fan assembly comprising an air inlet, at least one air outlet, an impeller, a motor for rotating the impeller to draw air through the air inlet, at least one heater assembly, and a user interface for allowing a user to select a speed setting for the motor from a user selectable range of speed settings, and for allowing a user to select one of a first and second operational mode of the fan assembly. A rotational speed of the motor is set depending on the user selected speed setting, and is selected from a first range of values when the first operational mode of the fan assembly has been selected, and from at least one second range of values when the second operational mode of the fan assembly has been selected, with each value within each of the range of values being associated with a respective speed setting.

12 Claims, 12 Drawing Sheets

(51) Int. Cl.
*F24H 3/04* (2006.01)
*F24F 1/01* (2011.01)
*F04B 49/20* (2006.01)
*F24H 9/00* (2006.01)
*F24F 7/007* (2006.01)
*F24F 11/00* (2006.01)
*F24F 13/06* (2006.01)
*F24H 9/18* (2006.01)

(52) U.S. Cl.
CPC .......... *F24F 11/0079* (2013.01); *F24F 13/06* (2013.01); *F24H 3/0417* (2013.01); *F24H 9/0063* (2013.01); *F24F 2221/34* (2013.01); *F24H 9/1827* (2013.01); *Y02B 30/746* (2013.01)

(58) Field of Classification Search
CPC ............. F04D 15/0066; F04D 15/0254; F04D 15/0263; F04F 5/14–5/16; F04B 2207/03; F04B 49/20
See application file for complete search history.

(56) References Cited

U.S. PATENT DOCUMENTS

| | | |
|---|---|---|
| 1,767,060 A | 6/1930 | Ferguson |
| 1,896,869 A | 2/1933 | Larsh |
| 1,961,179 A | 6/1934 | Tinkham |
| 2,014,185 A | 9/1935 | Martin |
| 2,035,733 A | 3/1936 | Wall |
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,691,345 A | 9/1972 | Needham et al. |
| 3,722,395 A | 3/1973 | Courchesne |
| 3,724,092 A | 4/1973 | McCleerey |
| 3,729,934 A | 5/1973 | Denning et al. |
| 3,743,186 A | 7/1973 | Mocarski |
| 3,749,379 A | 7/1973 | Brown |
| 3,767,895 A | 10/1973 | Needham |
| 3,795,367 A | 3/1974 | Mocarski |
| 3,855,450 A | 12/1974 | O'Connor |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,065,057 A | 12/1977 | Durmann |
| 4,073,613 A | 2/1978 | Desty |
| 4,090,814 A | 5/1978 | Teodorescu et al. |
| 4,113,416 A | 9/1978 | Kataoka et al. |
| 4,114,022 A | 9/1978 | Braulke, III |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,490,602 A | 12/1984 | Ishihara |
| 4,508,958 A * | 4/1985 | Kan et al. ..................... 392/364 |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,449,275 A | 9/1995 | Gluszek et al. |
| 5,511,724 A * | 4/1996 | Freiberger et al. .......... 236/49.3 |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,671,321 A | 9/1997 | Bagnuolo |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| 5,794,306 A | 8/1998 | Firdaus |
| D398,983 S | 9/1998 | Keller et al. |
| 5,841,080 A | 11/1998 | Iida et al. |
| 5,843,344 A | 12/1998 | Junkel et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,241,600 B1 | 6/2001 | Uehara |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,310,330 B1 * | 10/2001 | Stevanovic .......... H05B 1/0213 219/483 |

(56) References Cited

U.S. PATENT DOCUMENTS

| | | |
|---|---|---|
| 6,321,034 B2 | 11/2001 | Jones-Lawlor et al. |
| 6,386,845 B1 | 5/2002 | Bedard |
| 6,470,289 B1* | 10/2002 | Peters et al. .................. 702/132 |
| 6,480,672 B1 | 11/2002 | Rosenzweig et al. |
| 6,599,088 B2 | 7/2003 | Stagg |
| 6,604,694 B1 | 8/2003 | Kordas et al. |
| D485,895 S | 1/2004 | Melwani |
| 6,760,543 B1 | 7/2004 | Orr et al. |
| 6,789,787 B2 | 9/2004 | Stutts |
| 6,791,056 B2 | 9/2004 | VanOtteren et al. |
| 6,830,433 B2 | 12/2004 | Birdsell et al. |
| 6,940,051 B2* | 9/2005 | Tateishi ............... F24H 9/2071 |
| | | 219/486 |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |
| 7,198,473 B2 | 4/2007 | Stickland et al. |
| 7,412,781 B2 | 8/2008 | Mattinger et al. |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,660,110 B2 | 2/2010 | Vinson et al. |
| 7,664,377 B2 | 2/2010 | Liao |
| D614,280 S | 4/2010 | Dyson et al. |
| 7,731,050 B2 | 6/2010 | Parks et al. |
| 7,775,848 B1 | 8/2010 | Auerbach |
| 7,806,388 B2 | 10/2010 | Junkel et al. |
| 7,841,045 B2 | 11/2010 | Shaanan et al. |
| 8,002,520 B2 | 8/2011 | Dawson et al. |
| 8,029,244 B2 | 10/2011 | Dumas et al. |
| 8,092,166 B2 | 1/2012 | Nicolas et al. |
| 8,113,490 B2 | 2/2012 | Chen |
| 8,152,495 B2 | 4/2012 | Boggess, Jr. et al. |
| 8,246,317 B2 | 8/2012 | Gammack |
| 8,308,445 B2 | 11/2012 | Gammack et al. |
| 8,309,894 B2 | 11/2012 | Zimmer et al. |
| 8,348,629 B2 | 1/2013 | Fitton et al. |
| 8,356,804 B2 | 1/2013 | Fitton et al. |
| 8,366,403 B2 | 2/2013 | Wallace et al. |
| 8,454,322 B2 | 6/2013 | Gammack et al. |
| 8,529,226 B2 | 9/2013 | Li |
| 8,544,826 B2 | 10/2013 | Ediger et al. |
| 8,721,307 B2 | 5/2014 | Li |
| 9,182,134 B2 | 11/2015 | Ariga |
| 2002/0106547 A1 | 8/2002 | Sugawara et al. |
| 2003/0059307 A1 | 3/2003 | Moreno et al. |
| 2003/0059730 A1 | 3/2003 | Sigafus et al. |
| 2003/0164367 A1 | 9/2003 | Bucher et al. |
| 2003/0171093 A1 | 9/2003 | Gumucio Del Pozo |
| 2003/0190183 A1 | 10/2003 | Hsing |
| 2003/0234630 A1 | 12/2003 | Blake |
| 2004/0022631 A1 | 2/2004 | Birdsell et al. |
| 2004/0049842 A1 | 3/2004 | Prehodka |
| 2004/0106370 A1 | 6/2004 | Honda et al. |
| 2004/0149881 A1 | 8/2004 | Allen |
| 2004/0172847 A1 | 9/2004 | Saida et al. |
| 2004/0261286 A1* | 12/2004 | Green et al. .................. 34/527 |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0281672 A1 | 12/2005 | Parker et al. |
| 2006/0026858 A1 | 2/2006 | Saida et al. |
| 2006/0172682 A1 | 8/2006 | Orr et al. |
| 2006/0199515 A1 | 9/2006 | Lasko et al. |
| 2006/0263073 A1 | 11/2006 | Clarke et al. |
| 2006/0279927 A1 | 12/2006 | Strohm |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0269323 A1 | 11/2007 | Zhou et al. |
| 2008/0020698 A1 | 1/2008 | Spaggiari |
| 2008/0124060 A1 | 5/2008 | Gao |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0032130 A1 | 2/2009 | Dumas et al. |
| 2009/0039178 A1 | 2/2009 | Yoon |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0078120 A1 | 3/2009 | Kummer et al. |
| 2009/0120925 A1 | 5/2009 | Lasko |
| 2009/0191054 A1 | 7/2009 | Winkler |
| 2009/0214341 A1 | 8/2009 | Craig |
| 2010/0051715 A1 | 3/2010 | Vanderzwet et al. |
| 2010/0133707 A1 | 6/2010 | Huang |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1* | 9/2010 | Fitton et al. .................. 417/313 |
| 2010/0226801 A1 | 9/2010 | Gammack |
| 2010/0254800 A1 | 10/2010 | Fitton et al. |
| 2010/0256821 A1 | 10/2010 | Jeung et al. |
| 2011/0058935 A1 | 3/2011 | Gammack et al. |
| 2011/0070084 A1 | 3/2011 | Kuang |
| 2011/0110805 A1 | 5/2011 | Gammack et al. |
| 2011/0123181 A1 | 5/2011 | Ariga |
| 2011/0164959 A1 | 7/2011 | Fitton et al. |
| 2011/0198340 A1* | 8/2011 | Zimmer ............... F24H 3/0411 |
| | | 219/494 |
| 2011/0223014 A1 | 9/2011 | Crawford et al. |
| 2011/0223015 A1 | 9/2011 | Gammack et al. |
| 2012/0031509 A1 | 2/2012 | Wallace et al. |
| 2012/0033952 A1* | 2/2012 | Wallace et al. .............. 392/367 |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0114513 A1 | 5/2012 | Simmonds et al. |
| 2012/0230658 A1 | 9/2012 | Fitton et al. |
| 2012/0308375 A1 | 12/2012 | Gammack |
| 2013/0026664 A1 | 1/2013 | Staniforth et al. |
| 2013/0028763 A1 | 1/2013 | Staniforth et al. |
| 2013/0028766 A1 | 1/2013 | Staniforth et al. |
| 2013/0129490 A1 | 5/2013 | Dos Reis et al. |
| 2013/0161842 A1 | 6/2013 | Fitton et al. |
| 2013/0199372 A1 | 8/2013 | Nock et al. |
| 2013/0272685 A1 | 10/2013 | Leow et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0323100 A1 | 12/2013 | Poulton et al. |
| 2013/0330215 A1 | 12/2013 | Li |

(56) References Cited

U.S. PATENT DOCUMENTS

| | | | |
|---|---|---|---|
| 2013/0341316 A1* | 12/2013 | Perez ............... | A47K 10/48 219/220 |
| 2014/0079566 A1 | 3/2014 | Gammack et al. | |
| 2014/0084492 A1 | 3/2014 | Staniforth et al. | |
| 2014/0205470 A1 | 7/2014 | Fitton et al. | |
| 2014/0210114 A1 | 7/2014 | Staniforth et al. | |
| 2014/0255173 A1 | 9/2014 | Poulton et al. | |
| 2014/0255217 A1 | 9/2014 | Li | |
| 2015/0016975 A1 | 1/2015 | Wallace et al. | |

FOREIGN PATENT DOCUMENTS

| | | |
|---|---|---|
| CA | 2155482 | 9/1996 |
| CA | 2155482 A * | 9/1996 |
| CH | 346643 | 5/1960 |
| CN | 2085866 | 10/1991 |
| CN | 2111392 | 7/1992 |
| CN | 1437300 | 8/2003 |
| CN | 2650005 | 10/2004 |
| CN | 2713643 | 7/2005 |
| CN | 1680727 | 10/2005 |
| CN | 2833197 | 11/2006 |
| CN | 201011346 | 1/2008 |
| CN | 201180678 | 1/2009 |
| CN | 201221477 | 4/2009 |
| CN | 101424279 | 5/2009 |
| CN | 101451754 | 6/2009 |
| CN | 201281416 | 7/2009 |
| CN | 201349269 | 11/2009 |
| CN | 101684828 | 3/2010 |
| CN | 101694322 | 4/2010 |
| CN | 201486901 | 5/2010 |
| CN | 101749288 | 6/2010 |
| CN | 201502549 | 6/2010 |
| CN | 201507461 | 6/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 102367813 | 3/2012 |
| CN | 102374659 | 3/2012 |
| CN | 202267207 | 6/2012 |
| CN | 202431623 | 9/2012 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| EP | 0 044 494 | 1/1982 |
| EP | 0186581 | 7/1986 |
| EP | 0 784 947 | 7/1997 |
| EP | 1 094 224 | 4/2001 |
| EP | 1 138 954 | 10/2001 |
| EP | 1357296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2246969 A1 * | 11/2010 |
| EP | 2 578 889 | 4/2013 |
| FR | 1033034 | 7/1953 |
| FR | 1095114 | 5/1955 |
| FR | 1119439 | 6/1956 |
| FR | 1.387.334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2482549 | 2/2012 |
| GB | 2484671 | 4/2012 |
| GB | 2484695 | 4/2012 |

(56) References Cited

FOREIGN PATENT DOCUMENTS

| | | |
|---|---|---|
| GB | 2484761 | 4/2012 |
| GB | 2493231 | 1/2013 |
| GB | 2493505 | 2/2013 |
| GB | 2493507 | 2/2013 |
| GB | 2500011 | 9/2013 |
| JP | 31-13055 | 8/1956 |
| JP | 35-4369 | 3/1960 |
| JP | 39-7297 | 3/1964 |
| JP | 46-7230 | 12/1971 |
| JP | 49-150403 | 12/1974 |
| JP | 51-7258 | 1/1976 |
| JP | 53-60100 | 5/1978 |
| JP | 56-167897 | 12/1981 |
| JP | S57-8396 | 1/1982 |
| JP | 57-71000 | 5/1982 |
| JP | 57-157097 | 9/1982 |
| JP | 61-31830 | 2/1986 |
| JP | 61-52159 | 4/1986 |
| JP | 61-116093 | 6/1986 |
| JP | 61-280787 | 12/1986 |
| JP | 62-191700 | 8/1987 |
| JP | 62-223494 | 10/1987 |
| JP | 63-36794 | 3/1988 |
| JP | 63-179198 | 7/1988 |
| JP | 63-306340 | 12/1988 |
| JP | 64-21300 U | 2/1989 |
| JP | 64-58955 | 3/1989 |
| JP | 64-83884 | 3/1989 |
| JP | 1-138399 | 5/1989 |
| JP | 1-224598 | 9/1989 |
| JP | 2-146294 | 6/1990 |
| JP | 2-218890 | 8/1990 |
| JP | 2-248690 | 10/1990 |
| JP | 3-52515 | 5/1991 |
| JP | 3-123520 | 5/1991 |
| JP | 3-267598 | 11/1991 |
| JP | 3-286775 | 12/1991 |
| JP | 4-43895 | 2/1992 |
| JP | 4-325199 | 11/1992 |
| JP | 4-366330 | 12/1992 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 8-21400 | 1/1996 |
| JP | 8-72525 | 3/1996 |
| JP | 9-100800 | 4/1997 |
| JP | 9-178083 | 7/1997 |
| JP | 9-287600 | 11/1997 |
| JP | 11-502586 | 3/1999 |
| JP | 11-227866 | 8/1999 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2002-270336 | 9/2002 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-3015 | 1/2006 |
| JP | 2006-89096 | 4/2006 |
| JP | 3127331 | 11/2006 |
| JP | 2007-138763 | 6/2007 |
| JP | 2007-138789 | 6/2007 |
| JP | 2008-39316 | 2/2008 |
| JP | 2008-100204 | 5/2008 |
| JP | 3146538 | 10/2008 |
| JP | 2008-294243 | 12/2008 |
| JP | 2009-30878 | 2/2009 |
| JP | 2009-44568 | 2/2009 |
| JP | 2009-62986 | 3/2009 |
| JP | 2010-7999 | 1/2010 |
| JP | 2010-131259 | 6/2010 |
| JP | 2010-203764 | 9/2010 |
| JP | 2012-7779 | 1/2012 |
| JP | 2012-31806 | 2/2012 |
| JP | 2012-36897 | 2/2012 |
| KR | 1999-002660 | 1/1999 |
| KR | 10-2005-0102317 | 10/2005 |
| KR | 2007-0007997 | 1/2007 |
| KR | 20-0448319 | 3/2010 |
| KR | 10-2010-0055611 | 5/2010 |
| KR | 10-0985378 | 9/2010 |
| TW | 517825 | 1/2003 |
| TW | 589932 | 6/2004 |
| TW | M394383 | 12/2010 |
| TW | M399207 | 3/2011 |
| TW | M407299 | 7/2011 |
| WO | WO 90/13478 | 11/1990 |
| WO | WO-95/06822 | 3/1995 |
| WO | WO-02/073096 | 9/2002 |
| WO | WO 03/058795 | 7/2003 |
| WO | WO-03/069931 | 8/2003 |
| WO | WO-2005/050026 | 6/2005 |
| WO | WO 2005/057091 | 6/2005 |
| WO | WO-2006/008021 | 1/2006 |
| WO | WO-2006/012526 | 2/2006 |
| WO | WO 2007/024955 | 3/2007 |
| WO | WO 2007/048205 | 5/2007 |
| WO | WO 2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/050041 | 4/2011 |
| WO | WO-2012/006882 | 1/2012 |
| WO | WO-2012/017219 | 2/2012 |
| WO | WO-2012/033517 | 3/2012 |
| WO | WO-2012/052737 | 4/2012 |
| WO | WO-2013/014419 | 1/2013 |

OTHER PUBLICATIONS

Gammack, P. et al., U.S. Office Action dated Dec. 9, 2010, directed to U.S. Appl. No. 12/203,698; 10 pages.

Gammack, P. et al., U.S. Office Action dated Jun. 21, 2011, directed to U.S. Appl. No. 12/203,698; 11 pages.

Gammack et al., Office Action dated Sep. 17, 2012, directed to U.S. Appl. No. 13/114,707; 12 pages.

Gammack, P. et al., U.S. Office Action dated Dec. 10, 2010, directed to U.S. Appl. No. 12/230,613; 12 pages.

Gammack, P. et al., U.S. Office Action dated May 13, 2011, directed to U.S. Appl. No. 12/230,613; 13 pages.

Gammack, P. et al., U.S. Office Action dated Sep. 7, 2011, directed to U.S. Appl. No. 12/230,613; 15 pages.

Gammack, P. et al., U.S. Office Action dated Jun. 8, 2012, directed to U.S. Appl. No. 12/230,613; 15 pages.

Gammack et al., U.S. Office Action dated Aug. 20, 2012, directed to U.S. Appl. No. 12/945,558; 15 pages.

Fitton et al., U.S. Office Action dated Nov. 30, 2010 directed to U.S. Appl. No. 12/560,232; 9 pages.

Nicolas, F. et al., U.S. Office Action dated Mar. 7, 2011, directed to U.S. Appl. No. 12/622,844; 10 pages.

Nicolas, F. et al., U.S. Office Action dated Sep. 8, 2011, directed to U.S. Appl. No. 12/622,844; 11 pages.

(56) References Cited

OTHER PUBLICATIONS

Fitton, et al., U.S. Office Action dated Mar. 8, 2011, directed to U.S. Appl. No. 12/716,780; 12 pages.
Fitton, et al., U.S. Office Action dated Sep. 6, 2011, directed to U.S. Appl. No. 12/716,780; 16 pages.
Gammack, P. et al., U.S. Office Action dated Dec. 9, 2010, directed to U.S. Appl. No. 12/716,781; 17 pages.
Gammack, P. et al., U.S. Final Office Action dated Jun. 24, 2011, directed to U.S. Appl. No. 12/716,781; 19 pages.
Gammack, P. et al., U.S. Office Action dated Apr. 12, 2011, directed to U.S. Appl. No. 12/716,749; 8 pages.
Gammack, P. et al., U.S. Office Action dated Sep. 1, 2011, directed to U.S. Appl. No. 12/716,749; 9 pages.
Gammack, P. et al., U.S. Office Action dated Jun. 25, 2012, directed to U.S. Appl. No. 12/716,749; 11 pages.
Fitton et al., U.S. Office Action dated Mar. 30, 2012, directed to U.S. Appl. No. 12/716,707; 7 pages.
Gammack, P. et al., U.S. Office Action dated May 24, 2011, directed to U.S. Appl. No. 12/716,613; 9 pages.
Gammack, P. et al. U.S. Office Action dated Oct. 18, 2012, directed to U.S. Appl. No. 12/917,247; 11 pages.
Reba, I. (1966). "Applications of the Coanda Effect," *Scientific American* 214:84-92.
Third Party Submission Under 37 CFR 1.99 filed Jun. 2, 2011, directed towards U.S. Appl. No. 12/203,698; 3 pages.
Wallace et al., U.S. Office Action dated May 2, 2014, directed to U.S. Appl. No. 13/192,223; 10 pages.
Wallace et al., Office Action dated Jun. 7, 2013, directed towards U.S. Appl. No. 13/192,223; 30 pages.
Fitton et al., Office Action dated May 24, 2013, directed towards U.S. Appl. No. 13/481,268; 11 pages.
International Search Report and Written Opinion dated Jul. 30, 2013, directed towards counterpart application No. PCT/GB2013/050779; 10 pages.
Wallace et al., Office Action dated Oct. 23, 2013, directed to U.S. Appl. No. 13/192,223; 18 pages.
Wallace et al., U.S. Office Action dated Jan. 5, 2016, directed to U.S. Appl. No. 14/505,821; 15 pages.
Leow et al., U.S. Office Action dated May 3, 2016, directed to U.S. Appl. No. 13/856,273; 13 pages.
Wallace et al., U.S. Office Action dated Sep. 9, 2016, directed to U.S. Appl. No. 14/505,821; 7 pages.
Leow et al., U.S. Office Action dated Feb. 10, 2017, directed to U.S. Appl. No. 13/856,273; 16 pages.
Wallace et al., U.S. Office Action dated Jul. 11, 2017, directed to U.S. Appl. No. 14/505,821; 20 pages.
Gammack et al., U.S. Office Action dated Feb. 28, 2013, directed to U.S. Appl. No. 12/945,558; 16 pages.
Gammack et al., U.S. Office Action dated Jun. 12, 2013, directed to U.S. Appl. No. 12/945,558; 20 pages.
Helps et al., U.S. Office Action dated Feb. 15, 2013, directed to U.S. Appl. No. 12/716,694; 12 pages.
Gammack et al., U.S. Office Action dated May 29, 2013, directed to U.S. Appl. No. 13/588,666; 11 pages.
Gammack et al., U.S. Office Action dated Sep. 27, 2013, directed to U.S. Appl. No. 13/588,666; 10 pages.
Gammack et al., U.S. Office Action dated Mar. 14, 2013, directed to U.S. Appl. No. 12/716,740; 15 pages.
Gammack et al., U.S. Office Action dated Sep. 6, 2013, directed to U.S. Appl. No. 12/716,740; 15 pages.
Gammack et al., U.S. Office Action dated Apr. 24, 2014, directed to U.S. Appl. No. 12/716,740; 16 pages.
Li et al., U.S. Office Action dated Oct. 25, 2013, directed to U.S. Appl. No. 13/686,480; 17 pages.
Fitton et al., U.S. Office Action dated Jun. 13, 2014, directed to U.S. Appl. No. 13/274,998; 11 pages.
Fitton et al., U.S. Office Action dated Jun. 13, 2014, directed to U.S. Appl. No. 13/275,034; 10 pages.
Gammack et al., U.S. Office Action dated Feb. 14, 2013, directed to U.S. Appl. No. 12/716,515; 21 pages.
Gammack et al., U.S. Office Action dated Aug. 19, 2013, directed to U.S. Appl. No. 12/716,515; 20 pages.
Gammack et al., U.S. Office Action dated Feb. 10, 2014, directed to U.S. Appl. No. 12/716,515; 21 pages.
Fitton et al., U.S. Office Action dated Dec. 31, 2013, directed to U.S. Appl. No. 13/718,693; 8 pages.
Staniforth et al., U.S. Office Action dated Sep. 18, 2014, directed to U.S. Appl. No. 13/559,142; 18 pages.
Gammack et al., U.S. Office Action dated Sep. 3, 2014, directed to U.S. Appl. No. 13/861,891; 7 pages.

\* cited by examiner

FAN ASSEMBLY

REFERENCE TO RELATED APPLICATIONS

This application claims the priority of United Kingdom Application No. 1206889.6, filed Apr. 19, 2012, the entire contents of which are incorporated herein by reference.

FIELD OF THE INVENTION

The present invention relates to a fan assembly. In a preferred embodiment, the present invention relates to a fan assembly which can be used in a selected one of a heater mode to create a warm air current in a room, office or other domestic environment, and a fan mode to create a cooling air current in the domestic environment.

BACKGROUND OF THE INVENTION

A conventional domestic fan typically includes a set of blades or vanes mounted for rotation about an axis, and drive apparatus for rotating the set of blades to generate an air flow. The movement and circulation of the air flow creates a 'wind chill' or breeze and, as a result, the user experiences a cooling effect as heat is dissipated through convection and evaporation.

Such fans are available in a variety of sizes and shapes. For example, a ceiling fan can be at least 1 m in diameter, and is usually mounted in a suspended manner from the ceiling to provide a downward flow of air to cool a room. On the other hand, desk fans are often around 30 cm in diameter, and are usually free standing and portable. Floor-standing tower fans generally comprise an elongate, vertically extending casing around 1 m high and housing one or more sets of rotary blades for generating an air flow. An oscillating mechanism may be employed to rotate the outlet from the tower fan so that the air flow is swept over a wide area of a room.

Fan heaters generally comprise a number of heating elements located either behind or in front of the rotary blades to enable a user to heat the air flow generated by the rotating blades. The heating elements are commonly in the form of heat radiating coils or fins.

A variable thermostat, or a number of predetermined output power settings, is usually provided to enable a user to control the temperature of the air flow emitted from the fan heater.

A disadvantage of this type of arrangement is that the air flow produced by the rotating blades of the fan heater is generally not uniform. This is due to variations across the blade surface or across the outward facing surface of the fan heater. The extent of these variations can vary from product to product and even from one individual fan heater to another. These variations result in the generation of a turbulent, or 'choppy', air flow which can be felt as a series of pulses of air and which can be uncomfortable for a user. A further disadvantage resulting from the turbulence of the air flow is that the heating effect of the fan heater can diminish rapidly with distance.

In a domestic environment it is desirable for appliances to be as small and compact as possible due to space restrictions. It is undesirable for parts of the appliance to project outwardly, or for a user to be able to touch any moving parts, such as the blades. Fan heaters tend to house the blades and the heat radiating coils within a cage or apertured casing to prevent user injury from contact with either the moving blades or the hot heat radiating coils, but such enclosed parts can be difficult to clean. Consequently, an amount of dust or other detritus can accumulate within the casing and on the heat radiating coils between uses of the fan heater. When the heat radiating coils are activated, the temperature of the outer surfaces of the coils can rise rapidly, particularly when the power output from the coils is relatively high, to a value in excess of 700° C. Consequently, some of the dust which has settled on the coils between uses of the fan heater can be burnt, resulting in the emission of an unpleasant smell from the fan heater for a period of time.

WO 2012/017219 describes a fan heater which does not use caged blades to project air from the fan heater. Instead, the fan heater comprises a base which houses a motor-driven impeller for drawing a primary air flow into the base, and an annular nozzle connected to the base and comprising an annular mouth through which the primary air flow is emitted from the fan. The nozzle defines a central opening through which air in the local environment of the fan assembly is drawn by the primary air flow emitted from the mouth, amplifying the primary air flow to generate an air current. Without the use of a bladed fan to project the air current from the fan heater, a relatively uniform air current can be generated and guided into a room or towards a user. A plurality of heaters is located within the nozzle to heat the primary air flow before it is emitted from the mouth. By housing the heaters within the nozzle, the user is shielded from the hot external surfaces of the heaters.

Each heater comprises a row of heater elements formed from positive temperature coefficient (PTC) ceramic material. The row of heater elements is sandwiched between two heat radiating components, each of which comprises an array of heat radiating fins located within a frame. The fins are formed from aluminium or other material with high thermal conductivity.

A user selects an operational speed setting using a button located on a user interface of the base, or using a remote control. A main control circuit of the fan heater sets a rotational speed for the motor depending on the user's selected speed setting.

SUMMARY OF THE INVENTION

In a first aspect the present invention provides a fan assembly comprising an air inlet, at least one air outlet, an impeller and a motor for rotating the impeller to draw air through the air inlet, at least one heater assembly, a user interface for allowing a user to select a speed setting for the motor from a single, user selectable range of speed settings, and for allowing a user to select one of a first operational mode of the fan assembly and a second operational mode of the fan assembly, and control means for setting a rotational speed of the motor depending on the user selected speed setting, wherein the control means is configured to select the rotational speed of the motor from a first range of values when the first operational mode of the fan assembly has been selected, and from at least one second range of values when the second operational mode of the fan assembly has been selected, and wherein, within each of the range of values, each value is associated with a respective one of the user selectable speed settings.

The user interface may allow the user to select a speed setting from a single range of different pre-defined speed settings for the rotational speed of the motor, and thus for the flow rate of the air emitted from the at least one air outlet. The range preferably comprises at least five different user selectable speed settings, and more preferably at least eight different user selectable speed settings. In a preferred example, the range has ten different speed settings, and the user is able to select within this range from setting "1" to setting "10" using the user interface. The motor is preferably in the form of a DC motor to maximise the number of different speed settings which may be selected by the user. The user interface may comprise one or more buttons or dials, or a touch sensitive screen, to allow the user to select the desired speed setting. Alternatively, or additionally, the user interface may comprise a remote control for transmitting signals which are indicative of the user's selected speed setting. Speed setting 1 may correspond to a relatively low rotational speed of the motor, whereas speed setting 10 may correspond to a relatively high rotational speed of the motor. The user may thus set the rotational speed of the motor indirectly using the user interface; the user may never be aware of the actual rotational speed of the motor, but aware only that selection of a higher rated speed setting increases the flow rate of air emitted from the fan assembly.

The fan assembly has a first operational mode and a second operational mode. The desired operational mode of the fan assembly is selectable by the user using the user interface. The first operational mode may be a fan mode, which is selected by a user when the fan assembly is to be used to generate a cooling air current in a room or other domestic environment. The second operational mode may be a heater mode, which is selected by a user when the fan assembly is to be used to generate a warming air current in a room or other domestic environment. The first operational mode or the second operational mode may alternatively be a spot heating mode, which is selected by a user when the fan assembly is to be used to warm air in a local environment in front of the fan assembly. As a further alternative, the fan assembly may have a third operational mode, which is such a spot heating mode.

The control means is configured to set the rotational speed of the motor depending on both the user selected speed setting and the selected operational mode of the fan assembly. When the first operational mode has been selected, the control means is configured to select the rotational speed of the motor from a first range of values. When the second operational mode has been selected, the control means is configured to select the rotational speed of the motor from at least one second range of values different from the first range of values.

Within each of the range of values, each value is associated with a respective one of the user selectable speed settings. The following table illustrates an example of a first range of values and a second range of values for the rotational speed of the motor for a given supply voltage, and where the first operational mode is a fan mode and the second operational mode is a heater mode.

| Speed setting | First range of values (rpm) | Second range of values (rpm) |
|---|---|---|
| 10 | 9000 | 6750 |
| 9 | 8530 | 6600 |
| 8 | 8065 | 6375 |
| 7 | 7600 | 6150 |
| 6 | 7135 | 5925 |
| 5 | 6670 | 5700 |
| 4 | 6200 | 5475 |
| 3 | 5735 | 5250 |
| 2 | 5265 | 5025 |
| 1 | 4800 | 4800 |

For any of the user selectable speed settings, the control means may thus set a rotational speed of the motor which is most appropriate for the selected operational mode of the fan assembly. For example, when the speed setting 10 is selected and the first operational mode, or fan mode, is selected by the user, the control means selects a relatively high speed to create a relatively fast moving breeze within the environment in which the fan assembly is located. On the other hand, when the speed setting 10 is selected and the second operational mode, or heater mode, is selected by the user, the control means selects a lower speed to avoid the undesirable creation of a draught within the environment to be heated by the fan assembly.

As indicated by the above table, each range of values has a maximum value and a minimum value, and each of the range of values preferably has a different respective maximum value. Each of the range of values may have the same minimum value or a different respective minimum value.

The user interface is configured to display continuously the selected operational mode of the fan assembly. For example, the user interface may comprise a first LED or other light source which is illuminated when the first operational mode has been selected by the user, and a second LED or other light source which is illuminated when the second operational mode has been selected by the user. The light sources may radiate light of a respective colour; for example the first light source may emit blue light and the second light source may emit red light.

As mentioned above, the first operational mode of the fan assembly is preferably a fan mode, and the fan assembly is preferably configured so that during the fan mode the at least one heater assembly is not actuable by the control means. In other words, during the fan mode the motor is preferably actuated continuously, and the at least one heater assembly is not actuated, irrespective of the ambient temperature. The first range of values for this fan mode of the fan assembly preferably has a maximum value which is higher than the maximum value of each of the at least one second range of values. The first range of values preferably has a maximum value which is at least 1,000 rpm higher than the maximum value of each of the at least one second range of values.

The second operational mode of the fan assembly is preferably a heater mode during which the at least one heater assembly is actuable by the control means. The fan assembly preferably comprises temperature detecting means for detecting a temperature which is indicative of the temperature of the environment in which the fan assembly is located, and the user interface is preferably configured to allow a user to select a temperature setting from a user selectable range of temperature settings. The control means is preferably configured to, in the heater mode, actuate the at least one heater assembly depending on a difference between the detected temperature and the selected temperature.

For example, when the detected temperature is below the selected temperature, the control means activates the at least one heater assembly to heat the air in the room or other environment in which the fan assembly is located. When the detected temperature has risen to 1° C. or other value above the selected temperature, the control means may then de-activate the at least one heater assembly. When the detected temperature has fallen to a temperature around 1° C. or other value below the selected temperature, the control means may re-activate the at least one heater assembly.

The control means may be configured to, in the heater mode, vary the rotational speed of the motor away from the selected rotational speed depending on a difference between the detected temperature and the selected temperature, or on the state of the at least one heater assembly. For example, the control means may reduce the rotational speed of the motor to a set value, such as 1,000 rpm, when the detected temperature is above the selected temperature, and/or when the at least one heater assembly has been de-activated, when the fan assembly is in the heater mode. The set value to which the rotational speed of the motor is reduced is preferably lower than the minimum value of each of the range of values.

The user interface may comprise one or more switches, buttons, dials or other user actuable features to allow a user to select the desired operational mode of the fan assembly. However, the control means is preferably configured to select the rotational speed of the motor from the first range of values when the user has selected a minimum temperature setting from the user selectable range of temperature settings, and from at least one second range of values when the user has selected a temperature setting other than the minimum temperature setting from the user selectable range of temperature settings. This can enable the user interface to be simplified.

The at least one heater assembly preferably comprises at least one positive temperature coefficient (PTC) heating element.

The fan assembly may further comprise current detecting means for detecting the magnitude of a current drawn by the at least one heater assembly, and the control means is preferably configured to, in the heater mode, control the rotational speed of the motor independently from the rotational speed setting selected by the user depending on a characteristic of the current drawn by the at least one heater assembly.

We have observed that the power drawn by a heater assembly which includes a PTC heating element varies depending on the flow rate of an air flow passing through the heater assembly, and thus on the rotational speed of a motor for rotating an impeller for creating the air flow. The power consumption of the fan assembly when in the heater mode may be controlled through monitoring or otherwise detecting the magnitude of a current drawn by one or more heater assemblies, and controlling the rotational speed of the motor depending on a characteristic of the detected current magnitude independently of the speed setting selected by the user. This can allow the power consumption of the fan assembly to be controlled when in the heater mode so that it is within a set power rating range.

The characteristic of the current drawn by the at least one heater assembly may be one of the magnitude of the current, the difference between the detected magnitude and a predetermined value, and the rate of change of the detected magnitude of the current.

The current detecting means may be provided by a heater control circuit, which is preferably in the form of a printed circuit board assembly, and which comprises supply current sensing circuitry. The heater control circuit may also comprise a triac circuitry for controlling the at least one PTC heater element, and a thermistor for detecting the temperature of the air flow drawn into the heating apparatus.

The control means may be provided by a main control circuit, which is preferably in the form of a separate printed circuit board assembly. The main control circuit preferably comprises a microcontroller or microprocessor unit, a power supply unit for receiving power from a power source, such as a mains power source, and a motor driver, preferably a brushless DC motor driver, for controlling the rotational speed of the motor. The main control circuit is arranged to receive signals from the supply current sensing circuitry which are indicative of the magnitude of the current drawn by the at least one heater assembly, and to control the rotational speed of the motor in accordance with those signals. The user interface preferably comprises a user interface control circuit, preferably also in the form of a separate printed circuit board, for transmitting signals to the main control circuit which are indicative of the user selected speed setting. The user interface control circuit may also transmit to the main control circuit signals which are indicative of a desired temperature setting selected by the user.

In the heater mode, the control means is preferably configured to adjust the rotational speed, $\omega$, of the motor independently from the user selected speed, $\omega_s$, during a first operational period of the control means. The control means is preferably configured to commence this first operational period upon activation of the at least one heating assembly. At the end of this first operational period, the control means is preferably configured to set the rotational speed of the motor from a second range of values according to the speed setting selected by the user.

The control means is preferably configured to, during the first operational period, control the rotational speed of the motor depending on the detected magnitude of the current drawn by the at least one heater assembly. When the at least one heater assembly is activated, this current is an inrush current drawn by the at least one heater assembly.

The control means is preferably configured to, during the first operational period, set the rotational speed of the motor at one of a non-user selectable range of values for the rotational speed of the motor depending on the detected magnitude of the current drawn by the at least one heater assembly. This non-user selectable range may or may not overlap with the first and second ranges of values for the rotational speed of the motor, but preferably comprises lower values for the rotational speed of the motor. In one example, the non-user selectable range of rotational speeds for the motor is in the range from 1,000 to 4,800 rpm. The maximum value of this non-user selectable range may be selected depending on the magnitude of the supply voltage.

As mentioned above, during the first operational period the rotational speed of the motor is set in dependence on the detected inrush current. As the detected current increases, the control means is preferably configured to increase the rotational speed of the motor, $\omega$, to a higher value selected from the non-user selectable range of values. The control means is preferably configured to, during the first operational period, maintain the rotational speed of the motor at a maximum value within the non-user selectable range of values for the rotational speed of the motor if the detected magnitude of the current drawn by the at least one heater assembly, I, is above an upper value, $I_{max1}$, set for this first operational mode of the control means. The value of $I_{max1}$ is preferably set according to the supply voltage, and is preferably set at a value in the range from 5 to 8 A depending on the supply voltage.

At the end of the first operational period, the control means is preferably configured to set the rotational speed to a value selected from a second range of values depending on the speed setting selected by the user. The control means is preferably configured to terminate the first operational period depending on one of the rate of change of the magnitude of the current drawn by the at least one heater assembly, and the magnitude of the current drawn by the at least one heater assembly.

The control means may be configured to terminate the first operational period when the rate of change of the magnitude of the current drawn by the at least one heater assembly, $dI/dt$, is below a set value. During the first operational period, the current drawn by the at least one heater assembly is preferably detected at predetermined intervals, for example every 0.5 seconds, and the change in the magnitude of the current drawn by the at least one heater assembly between consecutive current detections is measured. If the change in the magnitude of the current has been below the set value over a predetermined number of consecutive measurements, the control means is preferably configured to terminate the first operational period. The magnitude of this set value may be in the range of 0.1 to 0.25 A per interval, and the number of consecutive measurements may be in the range from 10 to 25. The magnitude of the set value and the number of consecutive measurements may be selected depending on the supply voltage. For example, when the supply voltage is lower than 200 V the control means may be configured to terminate the first operational period if the rate of change of the magnitude of the current drawn by the at least one heater assembly has been no greater than 0.2 A over 20 consecutive measurements taken at 0.5 second intervals. As another example, when the supply voltage is greater than 200 V the control means may be configured to terminate the first operational period if the rate of change of the magnitude of the current drawn by the at least one heater assembly has been no greater than 0.15 A over 14 consecutive measurements taken at 0.5 second intervals.

Irrespective of the current rate of change of the magnitude of the current drawn by the at least one heater assembly, the control means may be configured to terminate the first operational period when the magnitude of the current drawn by the at least one heater assembly is above an upper current limit, $I_{max2}$, where $I_{max2} > I_{max1}$. The value of $I_{max2}$ is also preferably set according to the supply voltage, and is preferably set at a value in the range from 8.9 to 13.1 A depending on the supply voltage.

Following the termination of the first operational period, the control means enters a second operational period during which the control means is preferably configured to adjust the rotational speed of the motor depending on the detected magnitude of the current drawn by the at least one heater assembly, preferably by changing the rotational speed of the motor depending on the detected magnitude of the current drawn by the at least one heater assembly. If the detected magnitude of the current drawn by the at least one heater assembly is above the upper current limit, $I_{max2}$, the control means is preferably configured to reduce the rotational speed of the motor to a lower rotational speed.

In the heater mode, the control means is preferably configured to select the rotational speed of the motor from one of a plurality of second ranges of values depending on the detected magnitude of the current drawn by the at least one heater assembly. The control means preferably stores at least five second ranges of values, more preferably at least eight second ranges of values. Within each second range, each value is associated with a respective speed setting. Each value with each of the range of values is associated with a respective speed setting. The following table illustrates an example of eight different second ranges of values for the rotational speed of the motor for a given supply voltage.

| Speed setting | Second speed range 8 (rpm) | Second speed range 7 (rpm) | Second speed range 6 (rpm) | Second speed range 5 (rpm) | Second speed range 4 (rpm) | Second speed range 3 (rpm) | Second speed range 2 (rpm) | Second speed range 1 (rpm) |
|---|---|---|---|---|---|---|---|---|
| 10 | 6750 | 6600 | 6375 | 6150 | 5925 | 5700 | 5475 | 5250 |
| 9 | 6600 | 6400 | 6200 | 6000 | 5800 | 5600 | 5400 | 5200 |
| 8 | 6375 | 6200 | 6025 | 5850 | 5675 | 5500 | 5325 | 5150 |
| 7 | 6150 | 6000 | 5850 | 5700 | 5550 | 5400 | 5250 | 5100 |
| 6 | 5925 | 5800 | 5675 | 5550 | 5425 | 5300 | 5175 | 5050 |
| 5 | 5700 | 5600 | 5500 | 5400 | 5300 | 5200 | 5100 | 5000 |
| 4 | 5475 | 5400 | 5325 | 5250 | 5175 | 5100 | 5025 | 4950 |
| 3 | 5250 | 5200 | 5150 | 5100 | 5050 | 5000 | 4950 | 4900 |
| 2 | 5025 | 5000 | 4975 | 4950 | 4925 | 4900 | 4875 | 4850 |
| 1 | 4800 | 4800 | 4800 | 4800 | 4800 | 4800 | 4800 | 4800 |

The control means is configured to, at the start of the second operational period, select the rotational speed of the motor from the highest range of values, which in the above example is second speed range 8. For example, if the user has selected speed setting 7, then the motor is rotated at a speed of 6150 rpm at the start of the second operational period. In the event that the detected magnitude of the current drawn by the at least one heater assembly is above the upper current limit, $I_{max2}$, the control means is preferably configured to select the rotational speed of the motor from the next lowest highest range of values, which in the above example is second speed range 7. For example, if the user has selected speed setting 7, then the rotational speed of the motor is reduced to 6000 rpm. In the event that there has not been a decrease in the detected magnitude of the current drawn by the at least one heater assembly to a value below the upper current limit, the control means preferably continues to select the rotational speed of the motor from the next lowest highest range of values until the detected magnitude of the current drawn by the at least one heater assembly has fallen below the upper current limit.

In the event that both the detected magnitude of the current drawn by the at least one heater assembly is above the upper current limit and the rotational speed of the motor is selected from the lowest second range of values, the control means is preferably configured to terminate activation of both the at least one heater assembly and the motor. The user interface may be actuated by the control means to display an error message.

In the event that there has been a decrease in the rotational speed of the motor during the second operational period, the control means is preferably configured to increase the rotational speed of the motor back towards the user selected rotational speed if the detected magnitude of the current drawn by the at least one heater assembly has fallen a lower current limit, $I_{min2}$, where $I_{min2} \leq I_{max2}$. The value of is also preferably set according to the supply voltage, and is preferably set at a value in the range from 8.5 to 12.7 A depending on the supply voltage. The control means is preferably arranged to reverse the prior incremental decrease in the rotational speed of the motor when returning the rotational speed of the motor back towards the user selected rotational speed.

The apparatus preferably comprises voltage detecting means for detecting a magnitude of the supply voltage, and the control means is preferably configured to terminate the second operational period and commence a third operation period if the detected magnitude of the voltage supplied to the fan assembly is below a lower voltage limit and the detected magnitude of the current drawn by the at least one heater assembly is below a set value. This set value is preferably the same as the set value monitored during the first operational period.

The control means is preferably configured to, during the third operational period, set the rotational speed of the motor to one of a non-user selectable range of values for the rotational speed of the motor depending on the detected magnitude of the current drawn by the at least one heater assembly. This range of values is preferably the same of that from which the control means sets the rotational speed of the motor during the first operational period. When the detected magnitude of the current drawn by the at least one heater assembly rises above the set value, the control means is preferably configured to re-start the first operational period.

The at least one air outlet preferably comprises a plurality of air outlets, and the at least one heater assembly preferably comprises a plurality of heater assemblies each comprising at least one positive temperature coefficient (PTC) heating element for heating air passing from the air inlet to a respective air outlet. The air outlets may be located on opposite sides of a bore through which air is drawn by air emitted from the air outlets.

In a second aspect, the present invention provides a method of controlling a fan assembly comprising an air inlet, at least one air outlet, an impeller, a motor for rotating the impeller to draw air through the air inlet, at least one heater assembly, and a user interface for allowing a user to select a speed setting for the motor from a single, user selectable range of speed settings, and for allowing a user to select one of a first operational mode of the fan assembly and a second operational mode of the fan assembly; wherein a rotational speed of the motor is set depending on the user selected speed setting, and is selected from a first range of values when the first operational mode of the fan assembly has been selected, and from at least one second range of values when the second operational mode of the fan assembly has been selected, and wherein, within each of the range of values, each value is associated with a respective one of the user selectable speed settings.

Features described above in connection with the first aspect of the invention are equally applicable to the second aspect of the invention, and vice versa.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
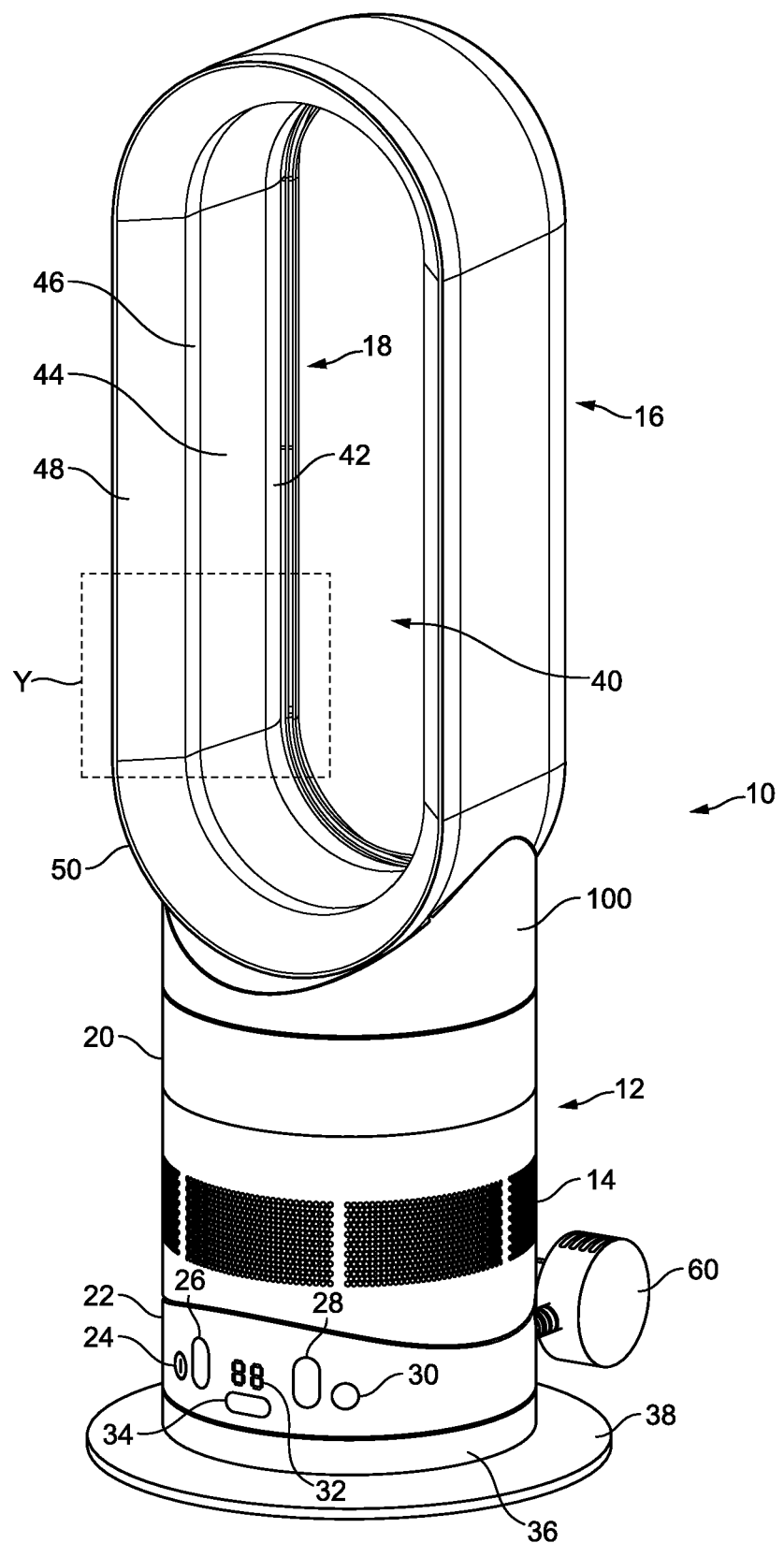
FIG. 1 is a front perspective view, from above, of a heating apparatus.
Figure 2:
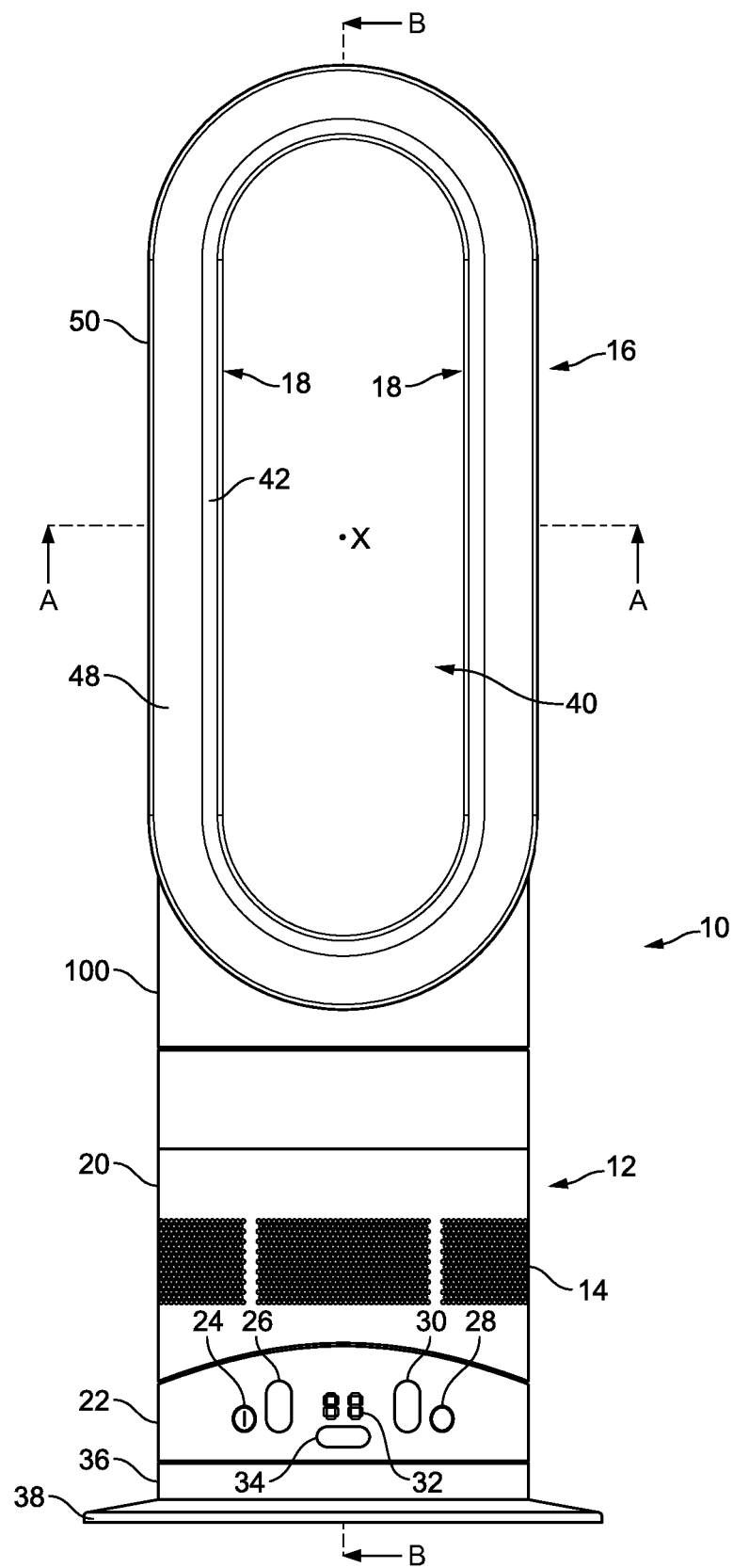
FIG. 2 is a front view of the heating apparatus.

FIGS. 1 and 2 illustrate external views of a fan assembly 10. The fan assembly 10 is in the form of a portable fan heater. The fan assembly 10 comprises a body 12 comprising an air inlet 14 through which a primary air flow enters the fan assembly 10, and a nozzle 16 in the form of an annular casing mounted on the body 12, and which comprises at least one air outlet 18 for emitting the primary air flow from the fan assembly 10.

The body 12 comprises a substantially cylindrical main body section 20 mounted on a substantially cylindrical lower body section 22. The main body section 20 and the lower body section 22 preferably have substantially the same external diameter so that the external surface of the upper body section 20 is substantially flush with the external surface of the lower body section 22. In this embodiment the body 12 has a height in the range from 100 to 300 mm, and a diameter in the range from 100 to 200 mm.

The main body section 20 comprises the air inlet 14 through which the primary air flow enters the fan assembly 10. In this embodiment the air inlet 14 comprises an array of apertures formed in the main body section 20. Alternatively, the air inlet 14 may comprise one or more grilles or meshes mounted within windows formed in the main body section 20. The main body section 20 is open at the upper end (as illustrated) thereof to provide an air outlet 23 through which the primary air flow is exhausted from the body 12.

The main body section 20 may be tilted relative to the lower body section 22 to adjust the direction in which the primary air flow is emitted from the fan assembly 10. For example, the upper surface of the lower body section 22 and the lower surface of the main body section 20 may be provided with interconnecting features which allow the main body section 20 to move relative to the lower body section 22 while preventing the main body section 20 from being lifted from the lower body section 22. For example, the lower body section 22 and the main body section 20 may comprise interlocking L-shaped members.

Figure 12:
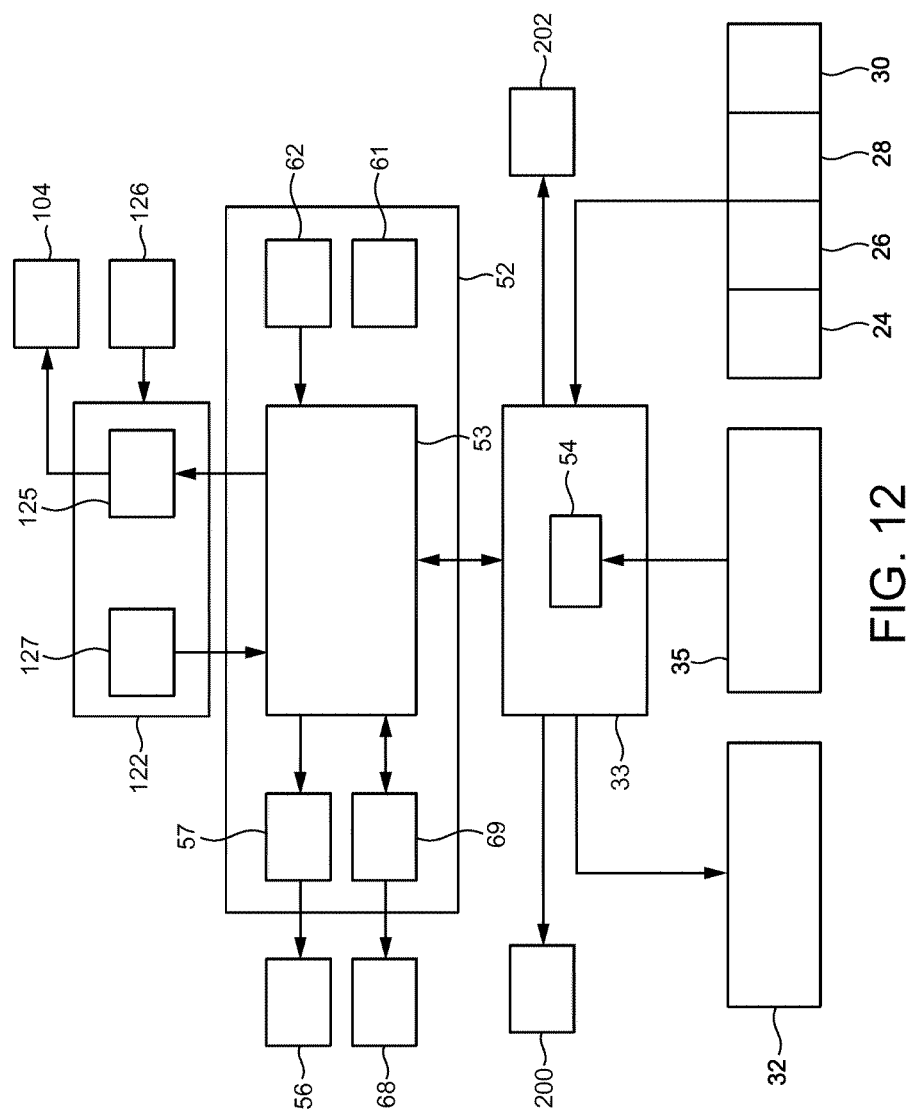
FIG. 12 is a schematic illustration of a control system of the heating apparatus.

The lower body section 22 comprises a user interface of the fan assembly 10. With reference also to FIG. 12, the user interface comprises a plurality of user-operable buttons 24, 26, 28, 30 for enabling a user to control various functions of the fan assembly 10, a display 32 located between the buttons for providing the user with, for example, a visual indication of a temperature setting of the fan assembly 10, and a user interface control circuit 33 connected to the buttons 24, 26, 28, 30 and the display 32. The lower body section 22 also includes a window 34 through which signals from a remote control 35 (shown schematically in FIG. 12) enter the fan assembly 10. The lower body section 22 is mounted on a base 36 for engaging a surface on which the fan assembly 10 is located. The base 36 includes an optional base plate 38, which preferably has a diameter in the range from 200 to 300 mm.

The nozzle 16 has an annular shape, extending about a central axis X to define an opening 40. The air outlets 18 for emitting the primary air flow from the fan assembly 10 are located towards the rear of the nozzle 16, and arranged to direct the primary air flow towards the front of the nozzle 16, through the opening 40. In this example, the nozzle 16 defines an elongate opening 40 having a height greater than its width, and the air outlets 18 are located on the opposite elongate sides of the opening 40. In this example the maximum height of the opening 40 is in the range from 300 to 400 mm, whereas the maximum width of the opening 40 is in the range from 100 to 200 mm.

The inner annular periphery of the nozzle 16 comprises a Coanda surface 42 located adjacent the air outlets 18, and over which at least some of the air outlets 18 are arranged to direct the air emitted from the fan assembly 10, a diffuser surface 44 located downstream of the Coanda surface 42 and a guide surface 46 located downstream of the diffuser surface 44. The diffuser surface 44 is arranged to taper away from the central axis X of the opening 38. The angle subtended between the diffuser surface 44 and the central axis X of the opening 40 is in the range from 5 to 25°, and in this example is around 7°. The guide surface 46 is preferably arranged substantially parallel to the central axis X of the opening 38 to present a substantially flat and substantially smooth face to the air flow emitted from the mouth 40. A visually appealing tapered surface 48 is located downstream from the guide surface 46, terminating at a tip surface 50 lying substantially perpendicular to the central axis X of the opening 40. The angle subtended between the tapered surface 48 and the central axis X of the opening 40 is preferably around 45°.

Figure 3:
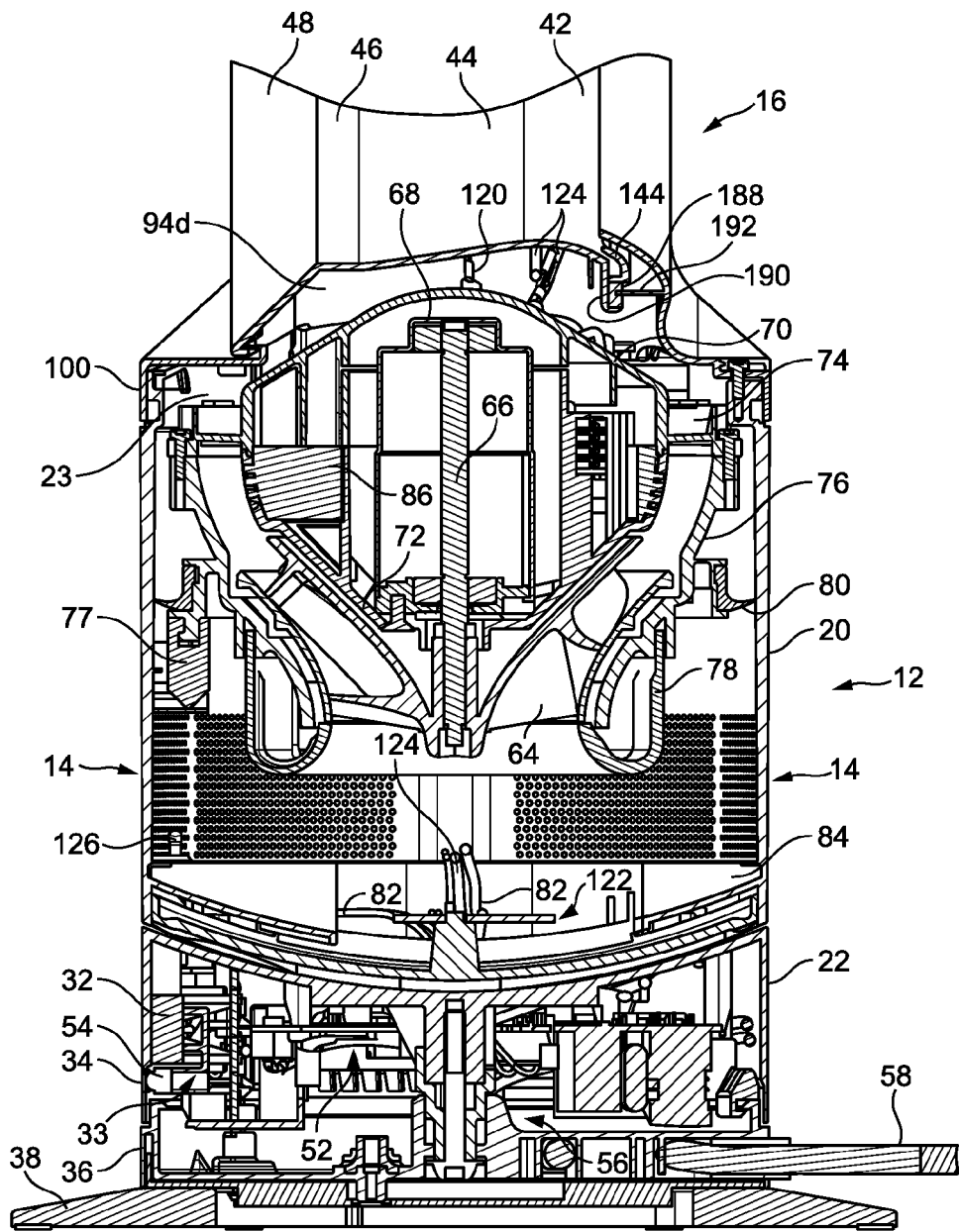
FIG. 3 is a sectional view taken along line B-B of FIG. 2.

FIG. 3 illustrates a sectional view through the body 12. The lower body section 22 houses a main control circuit, indicated generally at 52, connected to the user interface control circuit 33. The main control circuit 52 comprises a microprocessor 53, which is illustrated schematically in FIG. 12, and which in this example is a Renesas 8-bit R8C/2 L microcontroller. The user interface control circuit 33 comprises a sensor 54 for receiving signals from the remote control 35. The sensor 54 is located behind the window 34. In response to operation of the buttons 24, 26, 28, 30 and the remote control 35, the user interface control circuit 33 is arranged to transmit appropriate signals to the main control circuit 52 to control various operations of the fan assembly 10. The display 32 is located within the lower body section 22, and is arranged to illuminate part of the lower body section 22. The lower body section 22 is preferably formed from a translucent plastics material which allows the display 32 to be seen by a user.

The lower body section 22 also houses a mechanism, indicated generally at 56, for oscillating the lower body section 22 relative to the base 36. The main control circuit 52 comprises oscillation motor control circuitry 57 for driving the oscillation mechanism. The operation of the oscillating mechanism 56 is controlled by the main control circuit 52 upon receipt of an appropriate control signal from the remote control 35 or upon actuation of the button 30. The range of each oscillation cycle of the lower body section 22 relative to the base 36 is preferably between 60° and 120°, and in this embodiment is around 80°. In this embodiment, the oscillating mechanism 56 is arranged to perform around 3 to 5 oscillation cycles per minute. A mains power cable 58 for supplying electrical power to the fan assembly 10 extends through an aperture formed in the base 36. The cable 58 is connected to a plug 60. The main control circuit 52 comprises a power supply unit 61 connected to the cable 58, and a supply voltage sensing circuit 62 for detecting the magnitude of the supply voltage.

The main body section 20 houses an impeller 64 for drawing the primary air flow through the air inlet 14 and into the body 12. Preferably, the impeller 64 is in the form of a mixed flow impeller. The impeller 64 is connected to a rotary shaft 66 extending outwardly from a motor 68. In this embodiment, the motor 68 is a brushless DC motor having a speed which is variable by a brushless DC motor driver 69 of the main control circuit 52 in response to user manipulation of the button 26 and/or a signal received from the remote control 35.

The user interface permits the user to select one of a number of different pre-defined settings for the rotational speed of the motor 68. In this example, the user interface has ten different speed settings, and the user is able to select from setting "1" to setting "10" using the remote control 35 or the button 26 on the body 12. The number of the chosen speed setting may be displayed on the display 32 as the speed setting is changed by the user.

The motor 68 is housed within a motor bucket comprising an upper portion 70 connected to a lower portion 72. The upper portion 70 of the motor bucket comprises a diffuser 74 in the form of a stationary disc having spiral blades. The motor bucket is located within, and mounted on, a generally frusto-conical impeller housing 76. The impeller housing 76 is, in turn, mounted on a plurality of angularly spaced supports 77, in this example three supports, located within and connected to the main body section 20 of the base 12. The impeller 64 and the impeller housing 76 are shaped so that the impeller 64 is in close proximity to, but does not contact, the inner surface of the impeller housing 76. A substantially annular inlet member 78 is connected to the bottom of the impeller housing 76 for guiding the primary air flow into the impeller housing 76.

A flexible sealing member 80 is mounted on the impeller housing 76. The flexible sealing member prevents air from passing around the outer surface of the impeller housing to the inlet member 78. The sealing member 80 preferably comprises an annular lip seal, preferably formed from rubber. The sealing member 80 further comprises a guide portion in the form of a grommet for guiding an electrical cable 82 to the motor 68. The electrical cable 82 passes from the main control circuit 52 to the motor 68 through apertures formed in the main body section 20 and the lower body section 22 of the body 12, and in the impeller housing 76 and the motor bucket.

Preferably, the body 12 includes silencing foam for reducing noise emissions from the body 12. In this embodiment, the main body section 20 of the body 12 comprises a first annular foam member 84 located beneath the air inlet 14, and a second annular foam member 86 located within the motor bucket.

Figure 4:
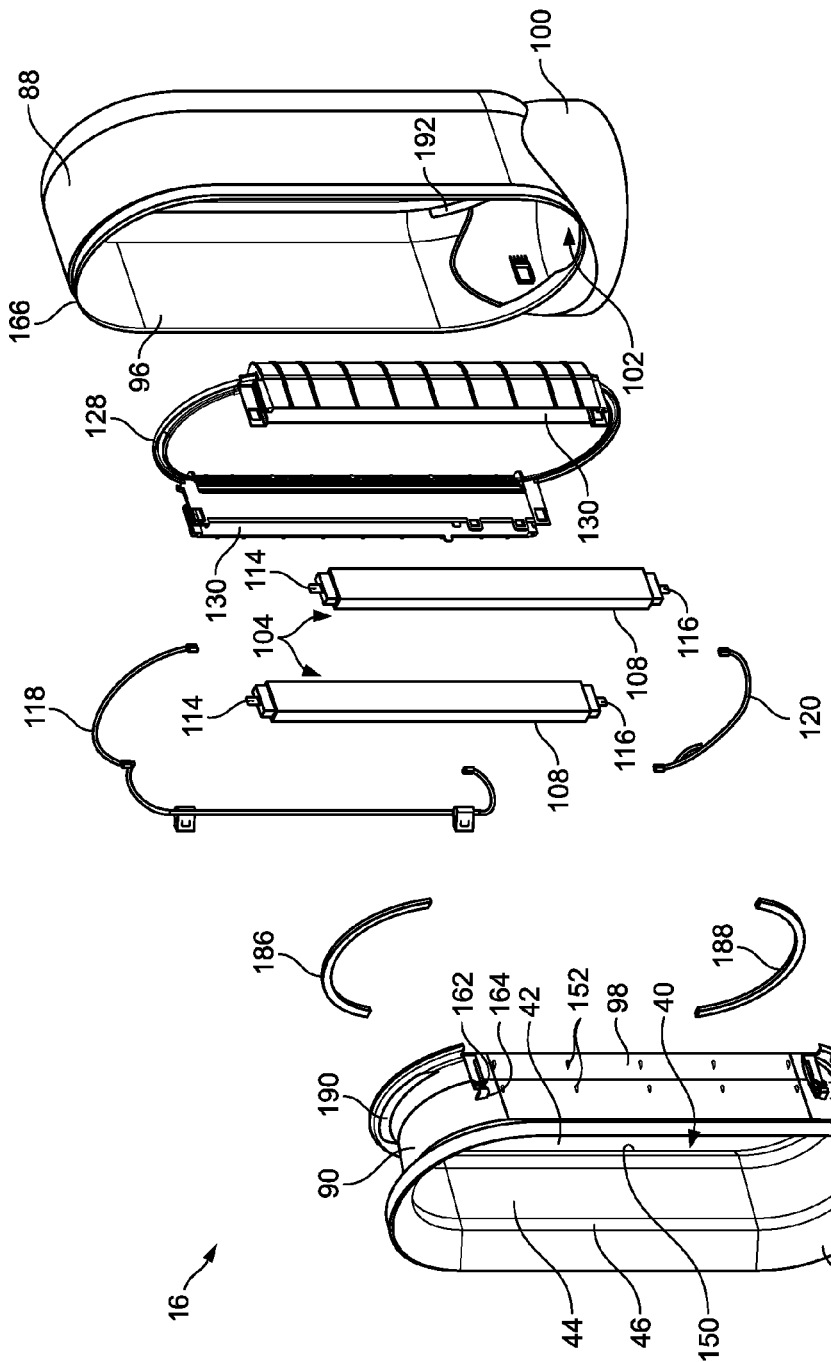
FIG. 4 is an exploded view of the nozzle of the heating apparatus.

The nozzle 16 will now be described in more detail with reference to FIGS. 4 to 11. With reference first to FIG. 4, the nozzle 16 comprises an annular outer casing section 88 connected to and extending about an annular inner casing section 90. Each of these sections may be formed from a plurality of connected parts, but in this embodiment each of the casing sections 88, 90 is formed from a respective, single moulded part. The inner casing section 90 defines the central opening 40 of the nozzle 16, and has an external surface 92 which is shaped to define the Coanda surface 42, diffuser surface 44, guide surface 46 and tapered surface 48.

Figure 9:
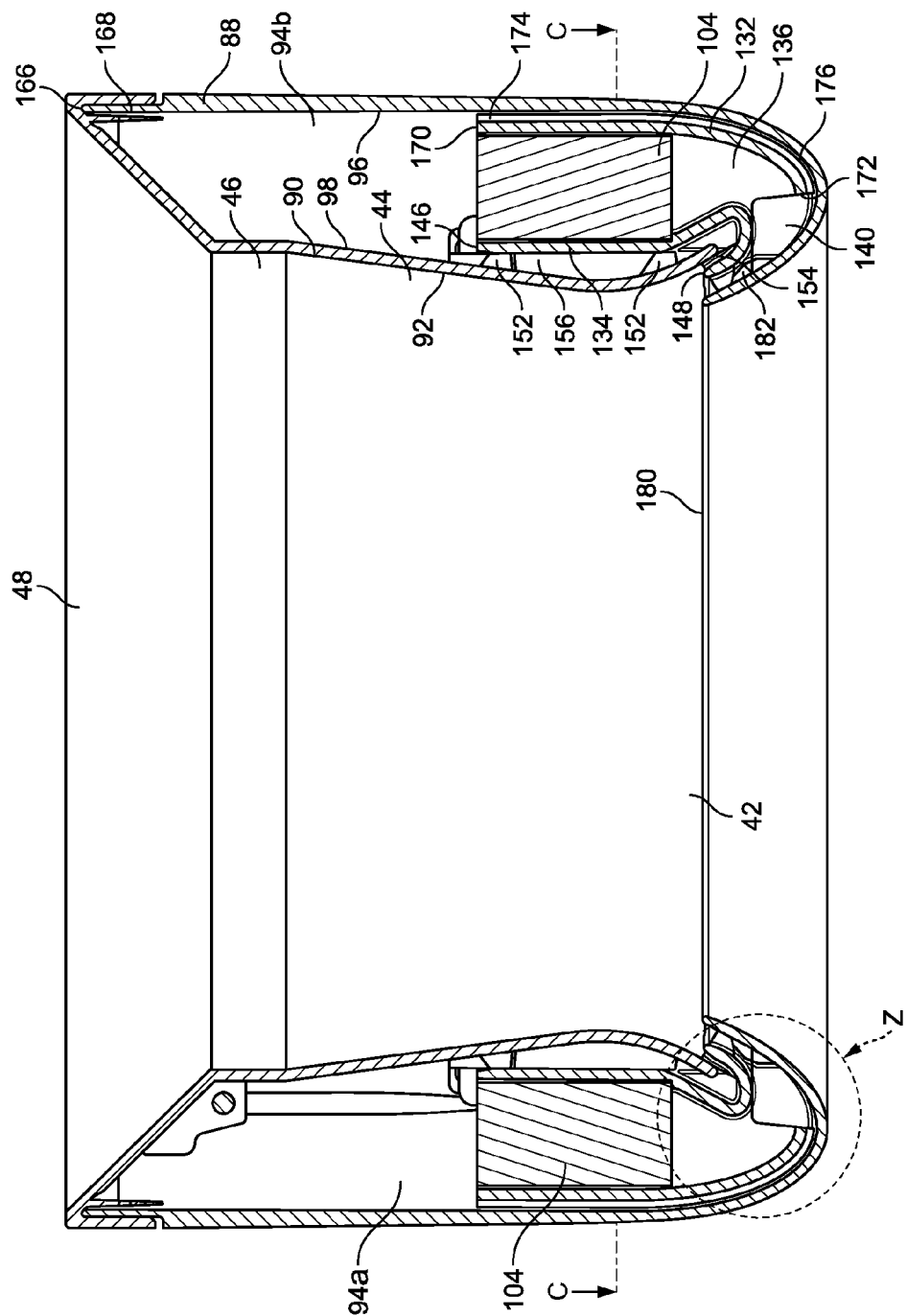
FIG. 9 is a sectional view taken along line A-A of FIG. 2.
Figure 10:
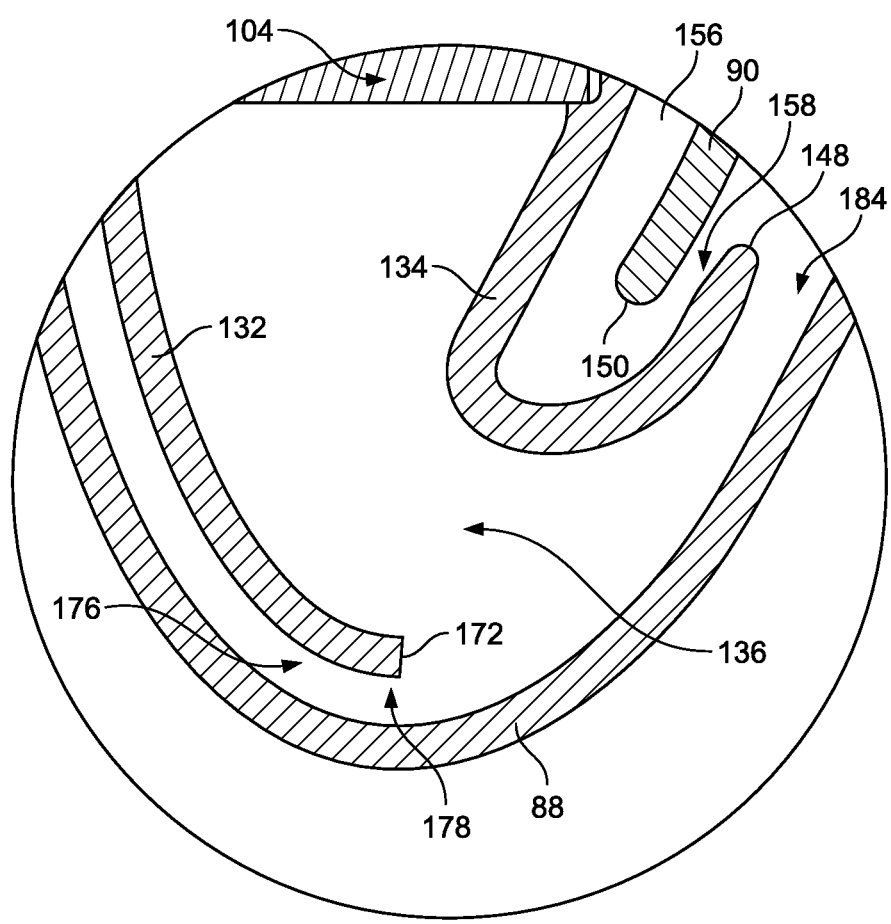
FIG. 10 is a close-up view of region Z indicated in FIG. 9.
Figure 11:
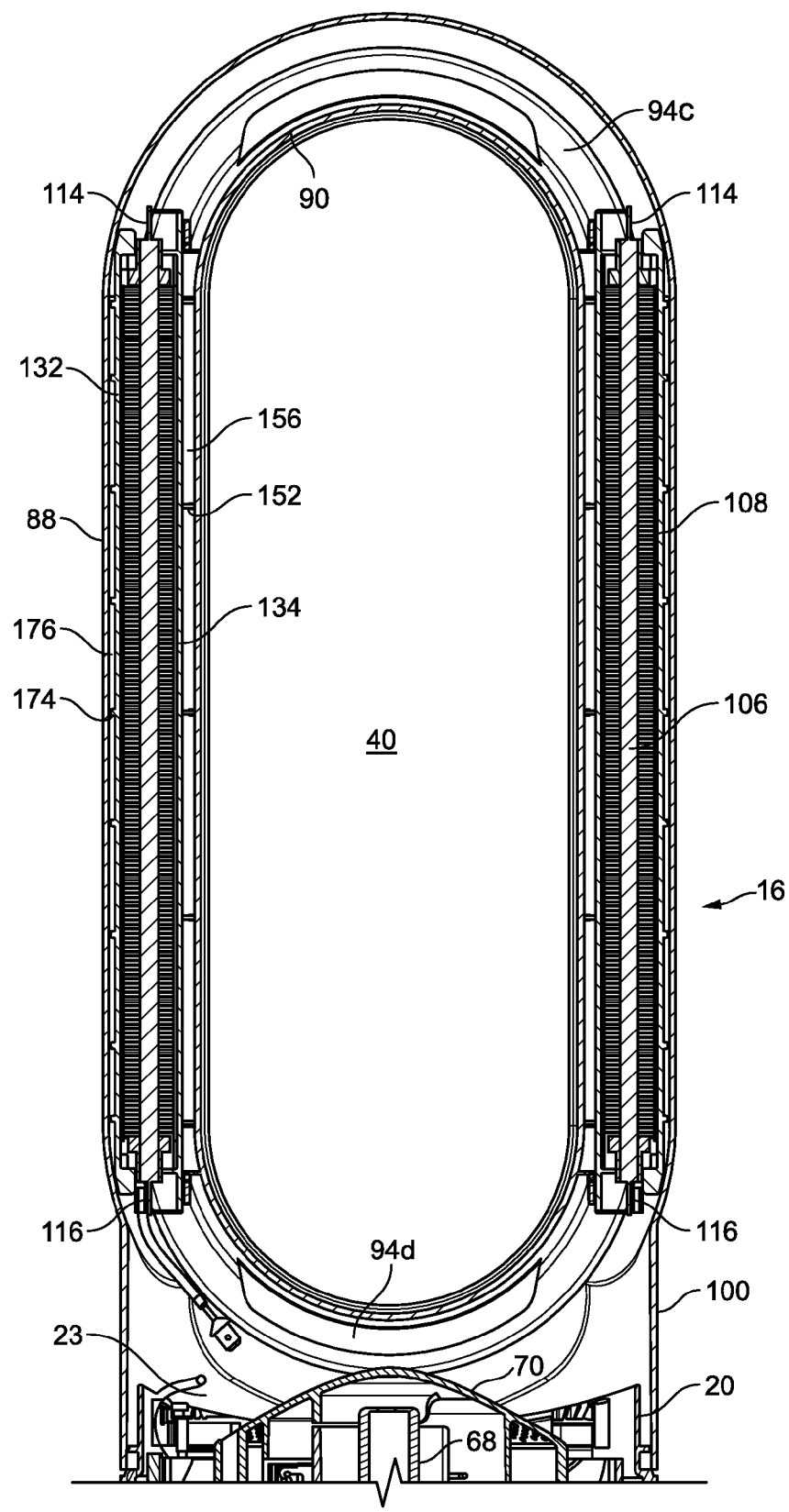
FIG. 11 is a sectional view of the nozzle taken along line C-C of FIG. 9.

The outer casing section 88 and the inner casing section 90 together define an annular interior passage of the nozzle 16. As illustrated in FIGS. 9 and 11, the interior passage extends about the opening 40, and thus comprises two relatively straight sections 94a, 94b each adjacent a respective elongate side of the opening 40, an upper curved section 94c joining the upper ends of the straight sections 94a, 94b, and a lower curved section 94d joining the lower ends of the straight 94a, 94b. The interior passage is bounded by the internal surface 96 of the outer casing section 88 and the internal surface 98 of the inner casing section 90.

As also shown in FIGS. 1 to 3, the outer casing section 88 comprises a base 100 which is connected to, and over, the open upper end of the main body section 20 of the base 12. The base 100 of the outer casing section 88 comprises an air inlet 102 through which the primary air flow enters the lower curved section 94d of the interior passage from the air outlet 23 of the base 12. Within the lower curved section 94d, the primary air flow is divided into two air streams which each flow into a respective one of the straight sections 94a, 94b of the interior passage.

The nozzle 16 also comprises a pair of heater assemblies 104. Each heater assembly 104 comprises a row of heater elements 106 arranged side-by-side. The heater elements 106 are preferably formed from positive temperature coefficient (PTC) ceramic material. The row of heater elements is sandwiched between two heat radiating components 108, each of which comprises an array of heat radiating fins 110 located within a frame 112. The heat radiating components 108 are preferably formed from aluminium or other material with high thermal conductivity (around 200 to 400 W/mK), and may be attached to the row of heater elements 106 using beads of silicone adhesive, or by a clamping mechanism. The side surfaces of the heater elements 106 are preferably at least partially covered with a metallic film to provide an electrical contact between the heater elements 106 and the heat radiating components 108. This film may be formed from screen printed or sputtered aluminium. Returning to FIGS. 3 and 4, electrical terminals 114, 116 located at opposite ends of the heater assembly 104 are each connected to a respective heat radiating component 108. Each terminal 114 is connected to an upper part 118 of a loom for supplying electrical power to the heater assemblies 104, whereas each terminal 116 is connected to a lower part 120 of the loom. The loom is in turn connected to a heater control circuit 122 located in the main body section 20 of the base 12 by wires 124. The heater control circuit 122 is in turn controlled by control signals supplied thereto by the main control circuit 52.

FIG. 12 illustrates schematically a control system of the fan assembly 10, which includes the control circuits 33, 52, 122, buttons 24, 26, 28, 30, and remote control 35. Two or more of the control circuits 33, 52, 122 may be combined to form a single control circuit. The heater control circuit 122 comprises two triac circuits 125 to control the heater elements 106 of the heater assemblies 104. A thermistor 126 for providing an indication of the temperature of the primary air flow entering the fan assembly 10 is connected to the heater control circuit 122. The thermistor 126 may be located immediately behind the air inlet 14, as shown in FIG. 3. The heater control circuit 122 further comprises a supply current sensing circuit 127 for detecting the magnitude of a current drawn by the heater elements 106 of the heater assemblies 104.

The user may set a desired room temperature or temperature setting by pressing button 28 of the user interface or a corresponding button of the remote control 35. The user interface control circuit 33 is arranged to vary the temperature displayed by the display 32 in response to the operation of the button 28, or the corresponding button of the remote control 35. In this example, the display 32 is arranged to display a temperature setting selected by the user, which may correspond to a desired room air temperature. Alternatively, the display 32 may be arranged to display one of a number of different temperature settings which has been selected by the user.

The main control circuit 52 supplies control signals to the user interface control circuit 33, the oscillation mechanism 56, the motor 68, and the heater control circuit 122, whereas the heater control circuit 122 supplies control signals to the heater assemblies 104. The heater control circuit 122 may also provide the main control circuit 52 with a signal indicating the temperature detected by the thermistor 126. The heater assemblies 104 may be controlled simultaneously by a common control signal, or they may be controlled by respective control signals.

The heater assemblies 104 are each retained within a respective straight section 94a, 94b of the interior passage by a chassis 128. The chassis 128 is illustrated in more detail in FIG. 5. The chassis 128 has a generally annular structure. The chassis 128 comprises a pair of heater housings 130 into which the heater assemblies 104 are inserted. Each heater housing 130 comprises an outer wall 132 and an inner wall 134. The inner wall 134 is connected to the outer wall 132 at the upper and lower ends 138, 140 of the heater housing 130 so that the heater housing 130 is open at the front and rear ends thereof. The walls 132, 134 thus define a first air flow channel 136 which passes through the heater assembly 104 located within the heater housing 130.

The heater housings 130 are connected together by upper and lower curved portions 142, 144 of the chassis 128. Each curved portion 142, 144 also has an inwardly curved, generally U-shaped cross-section. The curved portions 142, 144 of the chassis 128 are connected to, and preferably integral with, the inner walls 134 of the heater housings 130. The inner walls 134 of the heater housings 130 have a front end 146 and a rear end 148. With reference also to FIGS. 6 to 9, the rear end 148 of each inner wall 134 also curves inwardly away from the adjacent outer wall 132 so that the rear ends 148 of the inner walls 134 are substantially continuous with the curved portions 142, 144 of the chassis 128.

During assembly of the nozzle 16, the chassis 128 is pushed over the rear end of the inner casing section 90 so that the curved portions 142, 144 of the chassis 128 and the rear ends 148 of the inner walls 134 of the heater housings 130 are wrapped around the rear end 150 of the inner casing section 90. The inner surface 98 of the inner casing section 90 comprises a first set of raised spacers 152 which engage the inner walls 134 of the heater housings 130 to space the inner walls 134 from the inner surface 98 of the inner casing section 90. The rear ends 148 of the inner walls 134 also comprise a second set of spacers 154 which engage the outer surface 92 of the inner casing section 90 to space the rear ends of the inner walls 134 from the outer surface 92 of the inner casing section 90.

The inner walls 134 of the heater housing 130 of the chassis 128 and the inner casing section 90 thus define two second air flow channels 156. Each of the second flow channels 156 extends along the inner surface 98 of the inner casing section 90, and around the rear end 150 of the inner casing section 90. Each second flow channel 156 is separated from a respective first flow channel 136 by the inner wall 134 of the heater housing 130. Each second flow channel 156 terminates at an air outlet 158 located between the outer surface 92 of the inner casing section 90 and the rear end 148 of the inner wall 134. Each air outlet 158 is thus in the form of a vertically-extending slot located on a respective side of the opening 40 of the assembled nozzle 16. Each air outlet 158 preferably has a width in the range from 0.5 to 5 mm, and in this example the air outlets 158 have a width of around 1 mm.

Figure 5:
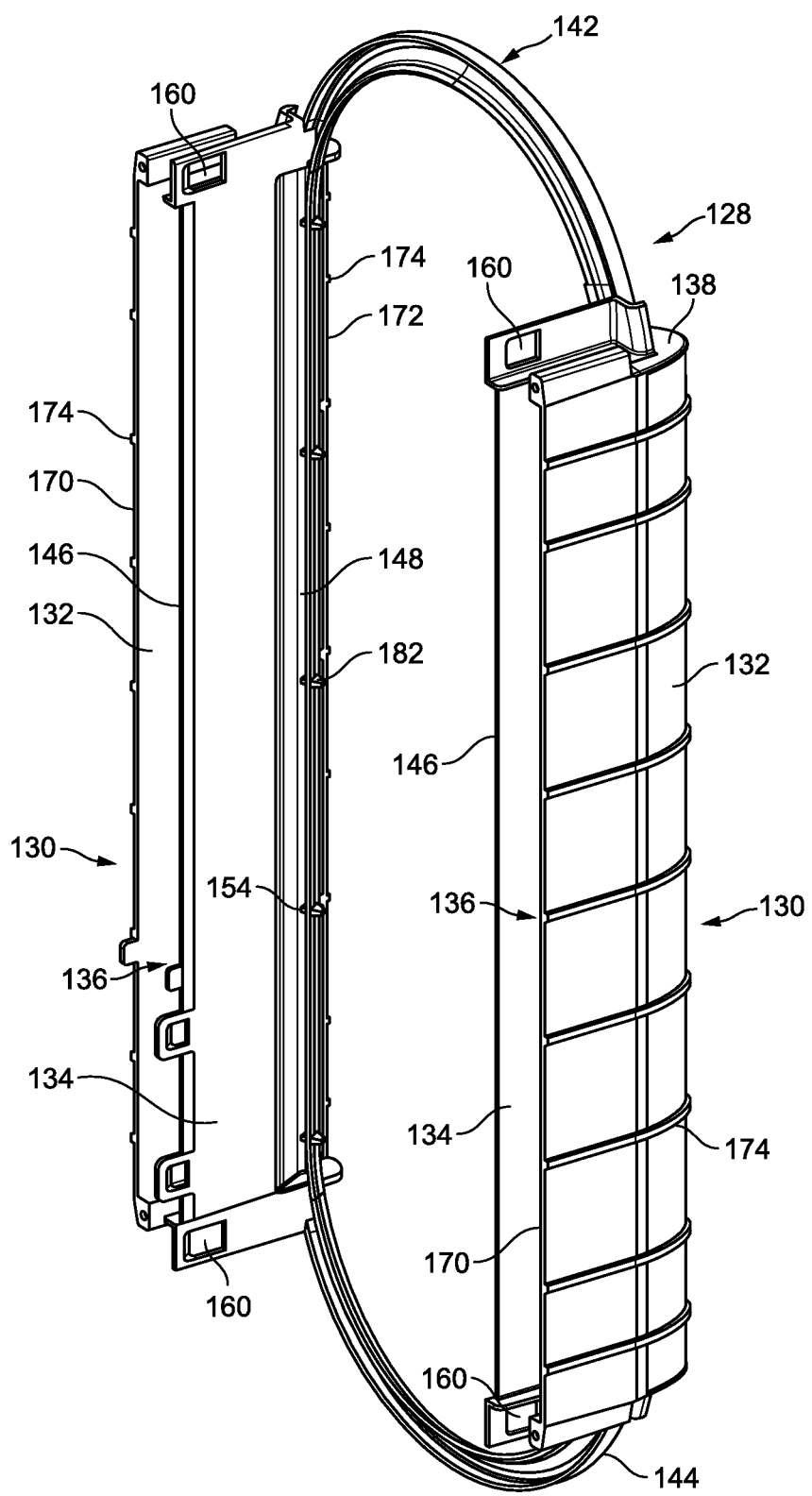
FIG. 5 is a front perspective view of the heater chassis of the nozzle.
Figure 6:
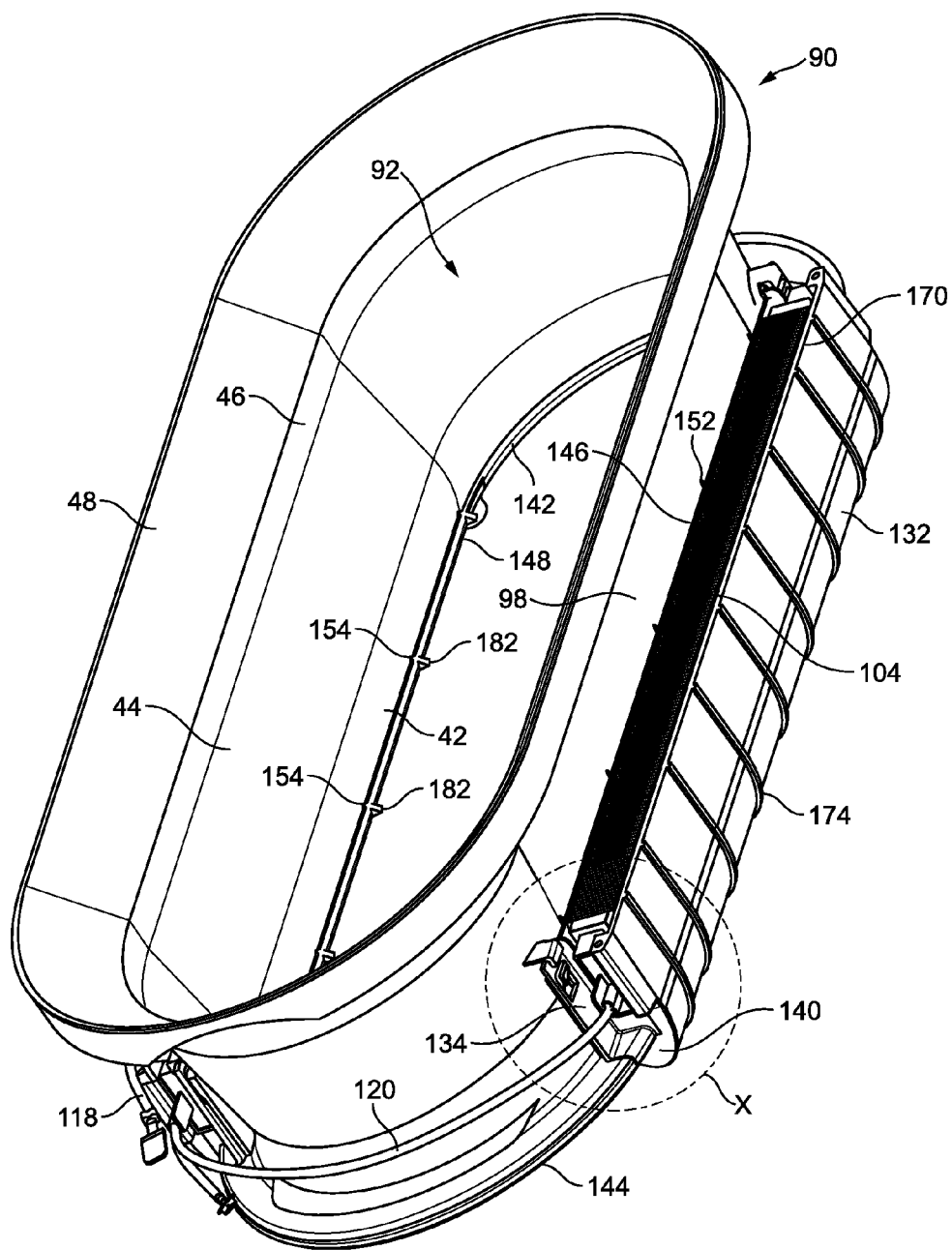
FIG. 6 is a front perspective view, from below, of the heater chassis connected to an inner casing section of the nozzle.
Figure 7:
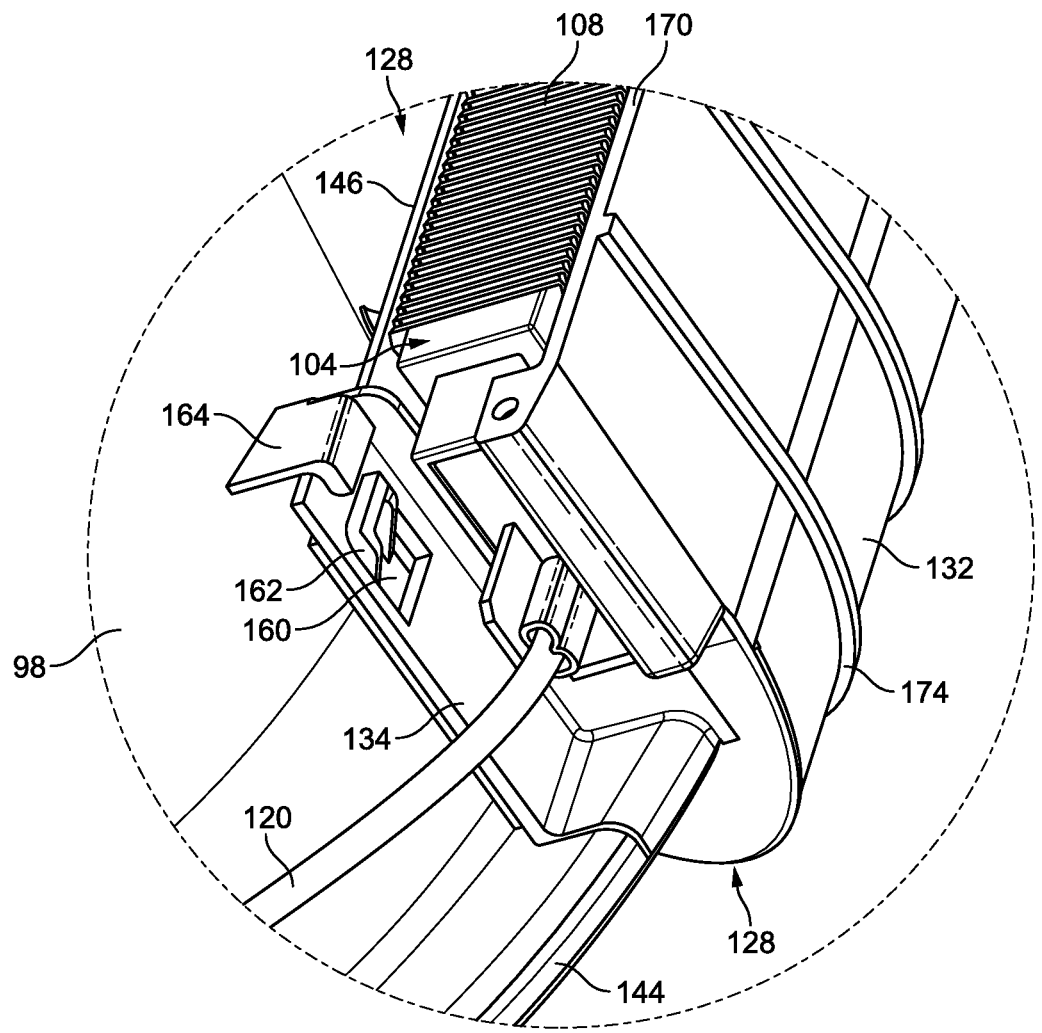
FIG. 7 is a close-up view of region X indicated in FIG. 6.
Figure 8:
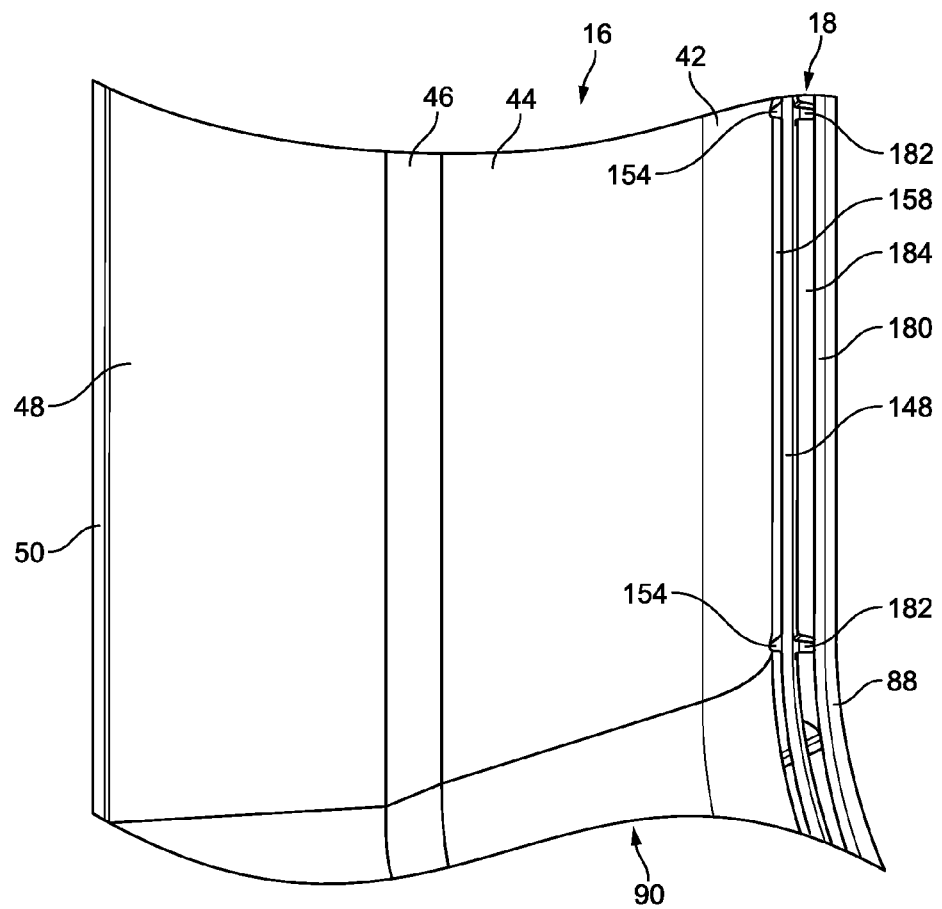
FIG. 8 is a close-up view of region Y indicated in FIG. 1.

The chassis 128 is connected to the inner surface 98 of the inner casing section 90. With reference to FIGS. 5 to 7, each of the inner walls 134 of the heater housings 130 comprises a pair of apertures 160, each aperture 160 being located at or towards a respective one of the upper and lower ends of the inner wall 134. As the chassis 128 is pushed over the rear end of the inner casing section 90, the inner walls 134 of the heater housings 130 slide over resilient catches 162 mounted on, and preferably integral with, the inner surface 98 of the inner casing section 90, which subsequently protrude through the apertures 160. The position of the chassis 128 relative to the inner casing section 90 can then be adjusted so that the inner walls 134 are gripped by the catches 162. Stop members 164 mounted on, and preferably also integral with, the inner surface 98 of the inner casing section 90 may also serve to retain the chassis 128 on the inner casing section 90.

With the chassis 128 connected to the inner casing section 90, the heater assemblies 104 are inserted into the heater housings 130 of the chassis 128, and the loom connected to the heater assemblies 104. Of course, the heater assemblies 104 may be inserted into the heater housings 130 of the chassis 128 prior to the connection of the chassis 128 to the inner casing section 90. The inner casing section 90 of the nozzle 16 is then inserted into the outer casing section 88 of the nozzle 16 so that the front end 166 of the outer casing section 88 enters a slot 168 located at the front of the inner casing section 90, as illustrated in FIG. 9. The outer and inner casing sections 88, 90 may be connected together using an adhesive introduced to the slot 168.

The outer casing section 88 is shaped so that part of the inner surface 96 of the outer casing section 88 extends around, and is substantially parallel to, the outer walls 132 of the heater housings 130 of the chassis 128. The outer walls 132 of the heater housings 130 have a front end 170 and a rear end 172, and a set of ribs 174 located on the outer side surfaces of the outer walls 132 and which extend between the ends 170, 172 of the outer walls 132. The ribs 174 are configured to engage the inner surface 96 of the outer casing section 88 to space the outer walls 132 from the inner surface 96 of the outer casing section 88. The outer walls 132 of the heater housings 130 of the chassis 128 and the outer casing section 88 thus define two third air flow channels 176. Each of the third flow channels 176 is located adjacent and extends along the inner surface 96 of the outer casing section 88. Each third flow channel 176 is separated from a respective first flow channel 136 by the outer wall 132 of the heater housing 130. Each third flow channel 176 terminates at an air outlet 178 located within the interior passage, and between the rear end 172 of the outer wall 132 of the heater housing 130 and the outer casing section 88. Each air outlet 178 is also in the form of a vertically-extending slot located within the interior passage of the nozzle 16, and preferably has a width in the range from 0.5 to 5 mm. In this example the air outlets 178 have a width of around 1 mm.

The outer casing section 88 is shaped so as to curve inwardly around part of the rear ends 148 of the inner walls 134 of the heater housings 130. The rear ends 148 of the inner walls 134 comprise a third set of spacers 182 located on the opposite side of the inner walls 134 to the second set of spacers 154, and which are arranged to engage the inner surface 96 of the outer casing section 88 to space the rear ends of the inner walls 134 from the inner surface 96 of the outer casing section 88. The outer casing section 88 and the rear ends 148 of the inner walls 134 thus define a further two air outlets 184. Each air outlet 184 is located adjacent a respective one of the air outlets 158, with each air outlet 158 being located between a respective air outlet 184 and the outer surface 92 of the inner casing section 90. Similar to the air outlets 158, each air outlet 184 is in the form of a vertically-extending slot located on a respective side of the opening 40 of the assembled nozzle 16. The air outlets 184 preferably have the same length as the air outlets 158. Each air outlet 184 preferably has a width in the range from 0.5 to 5 mm, and in this example the air outlets 184 have a width of around 2 to 3 mm. Thus, the air outlets 18 for emitting the primary air flow from the fan assembly 10 comprise the two air outlets 158 and the two air outlets 184.

Returning to FIGS. 3 and 4, the nozzle 16 preferably comprises two curved sealing members 186, 188 each for forming a seal between the outer casing section 88 and the inner casing section 90 so that there is substantially no leakage of air from the curved sections 94c, 94d of the interior passage of the nozzle 16. Each sealing member 186, 188 is sandwiched between two flanges 190, 192 located within the curved sections 94c, 94d of the interior passage. The flanges 190 are mounted on, and preferably integral with, the inner casing section 90, whereas the flanges 192 are mounted on, and preferably integral with, the outer casing section 88. As an alternative to preventing the air flow from leaking from the upper curved section 94c of the interior passage, the nozzle 16 may be arranged to prevent the air flow from entering this curved section 94c. For example, the upper ends of the straight sections 94a, 94b of the interior passage may be blocked by the chassis 128 or by inserts introduced between the inner and outer casing sections 88, 90 during assembly.

To operate the fan assembly 10 the user presses button 24 of the user interface, or presses a corresponding button of the remote control 35 to transmit a signal which is received by the sensor of the user interface control circuit 33. The user interface control circuit 33 communicates this action to the main control circuit 52. The main control circuit 52 analyses the temperature, $T_s$, selected by the user using the user interface, as provided by the user interface control circuit 33. In this example, when the temperature, $T_s$, selected by the user is at a minimum value, for example 0° C., the fan assembly 10 enters a first operational mode. In this example, the first operational mode is a fan mode, during which the heater assemblies 104 are not activated. The user interface may comprise a first LED 200 which is illuminated to indicate that the fan assembly 10 is in the fan mode. The first LED 200 may be a blue LED, and located behind the button 24 so that the button 24 appears to have a blue periphery when the fan assembly 10 is in the fan mode.

In this fan mode, the main control circuit 52 selects the rotational speed of the motor 68 from a first range of values, as listed below. Each value within the first range of values is associated with a respective one of the user selectable speed settings.

| Speed setting | First range of values (rpm) |
| --- | --- |
| 10 | 9000 |
| 9 | 8530 |
| 8 | 8065 |
| 7 | 7600 |
| 6 | 7135 |
| 5 | 6670 |

| Speed setting | First range of values (rpm) |
| --- | --- |
| 4 | 6200 |
| 3 | 5735 |
| 2 | 5265 |
| 1 | 4800 |

For example, if the user has selected speed setting 7, the motor 68 is rotated at 7,600 rpm. The primary air flow that is drawn into the fan assembly 10 by the rotating impeller 64 passes sequentially through the impeller housing 76 and the open upper end of the main body portion 22 to enter the lower curved section 94*d* of the interior passage of the nozzle 16. Within the lower curved section 94*d* of the interior passage of the nozzle 16, the primary air flow is divided into two air streams which pass in opposite directions around the opening 40 of the nozzle 16. One of the air streams enters the straight section 94*a* of the interior passage located to one side of the opening 40, whereas the other air stream enters the straight section 94*b* of the interior passage located on the other side of the opening 40. As the air streams pass through the straight sections 94*a*, 94*b*, the air streams turn through around 90° towards the air outlets 18 of the nozzle 16. To direct the air streams evenly towards the air outlets 18 along the length of the straight section 94*a*, 94*b*, the nozzle 16 may comprises a plurality of stationary guide vanes located within the straight sections 94*a*, 94*b* and each for directing part of the air stream towards the air outlets 18. The guide vanes are preferably integral with the internal surface 98 of the inner casing section 90. The guide vanes are preferably curved so that there is no significant loss in the velocity of the air flow as it is directed towards the air outlets 18. Within each straight section 94*a*, 94*b*, the guide vanes are preferably substantially vertically aligned and evenly spaced apart to define a plurality of passageways between the guide vanes and through which air is directed relatively evenly towards the air outlets 18.

The primary air flow emitted from the air outlets 18 passes over the Coanda surface 42 of the nozzle 16, causing a secondary air flow to be generated by the entrainment of air from the external environment, specifically from the region around the air outlets 18 and from around the rear of the nozzle. This secondary air flow passes through the opening 40 of the nozzle 16, where it combines with the primary air flow to produce an overall air flow projected forward from the fan assembly 10.

When the temperature, $T_s$, selected by the user is above the minimum value, for example in the range from 1 to 32° C., the fan assembly 10 enters a second operational mode. In this example, the second operational mode is a heater mode. The user interface may comprise a second LED 202 which is illuminated to indicate that the fan assembly 10 is in the fan mode. The second LED 202 may be a red LED, and located behind the button 24 so that the button 24 appears to have a red periphery when the fan assembly 10 is in the heater mode.

The main control circuit 52 compares the temperature, $T_s$, selected by the user with the temperature $T_a$, of the air within or passing though the fan assembly 10, as detected by the thermistor 126 and provided by the heater control circuit 122. When $T_a < T_s$, the main control circuit 52 instructs the heater control circuit 122 to activate the heater assemblies 104.

When the fan assembly 10 enters the heater mode, the main control circuit 52 commences a first operation period, in which the main control circuit 52 initially controls the rotational speed of the motor 68 depending on the detected magnitude of the current I drawn by the heater assemblies 104, as detected by the supply current sensing circuit 127 and communicated to the main control circuit 52 by the heater control circuit 122. Upon activation of the heater assemblies 104, this current is an inrush current drawn by the heater assemblies 104. Depending on the detected magnitude of the drawn current, the main control circuit 52 sets the rotational speed of the motor 68 at one of a non-user selectable range of values for the rotational speed of the motor 68. This non-user selectable range may have a minimum value of 1,000 rpm, and a maximum value which is selected depending on the supply voltage; for a 100V supply voltage the maximum value 4,000 rpm and for a 120V, 230V or 240V supply voltage the maximum value is 4,800 rpm.

As mentioned above, the magnitude of the rotational speed set by the main control circuit 52 at the start of the first operational period depends on the detected magnitude of the inrush current drawn by the heater assemblies 104. When the inrush current is relatively low, the main control circuit sets the rotational speed of the motor 68 at a relatively low value from the non-user selectable range of values, whereas when the inrush current is relatively high, the main control circuit sets the rotational speed of the motor 68 at a relatively high value from the non-user selectable range of values. If the detected inrush current is greater than a set value $I_{max1}$, the main control circuit 52 sets the rotational speed of the motor 68 to the highest rotational speed within the non-user selectable range of values. Again, the value of $I_{max1}$ is set according to the supply voltage; in this example $I_{max1}$=5.4 A for a 240V supply voltage, whereas $I_{max1}$=7.5 A for a 100V supply voltage, 7.8 A for a 120V supply voltage, and 5.5 A for a 230V supply voltage.

As the air streams flow towards the air outlets 18, a first portion of the primary air flow enters the first air flow channels 136 located between the walls 132, 134 of the chassis 128. Due to the splitting of the primary air flow into two air streams within the interior passage, each first air flow channel 136 may be considered to receive a first portion of a respective air stream. Each first portion of the primary air flow passes through a respective heating assembly 104. The heat generated by the activated heating assemblies is transferred by convection to the first portion of the primary air flow to raise the temperature of the first portion of the primary air flow.

A second portion of the primary air flow is diverted away from the first air flow channels 136 by the front ends 146 of the inner walls 134 of the heater housings 130 so that this second portion of the primary air flow enters the second air flow channels 156 located between the inner casing section 90 and the inner walls of the heater housings 130. Again, with the splitting of the primary air flow into two air streams within the interior passage each second air flow channel 156 may be considered to receive a second portion of a respective air stream. Each second portion of the primary air flow passes along the internal surface 92 of the inner casing section 90, thereby acting as a thermal barrier between the relatively hot primary air flow and the inner casing section 90. The second air flow channels 156 are arranged to extend around the rear wall 150 of the inner casing section 90, thereby reversing the flow direction of the second portion of the air flow, so that it is emitted through the air outlets 158 towards the front of the fan assembly 10 and through the opening 40. The air outlets 158 are arranged to direct the second portion of the primary air flow over the external surface 92 of the inner casing section 90 of the nozzle 16.

A third portion of the primary air flow is also diverted away from the first air flow channels 136. This third portion of the primary air flow by the front ends 170 of the outer walls 132 of the heater housings 130 so that the third portion of the primary air flow enters the third air flow channels 176 located between the outer casing section 88 and the outer walls 132 of the heater housings 130. Once again, with the splitting of the primary air flow into two air streams within the interior passage each third air flow channel 176 may be considered to receive a third portion of a respective air stream. Each third portion of the primary air flow passes along the internal surface 96 of the outer casing section 88, thereby acting as a thermal barrier between the relatively hot primary air flow and the outer casing section 88. The third air flow channels 176 are arranged to convey the third portion of the primary air flow to the air outlets 178 located within the interior passage. Upon emission from the air outlets 178, the third portion of the primary air flow merges with this first portion of the primary air flow. These merged portions of the primary air flow are conveyed between the inner surface 96 of the outer casing section 88 and the inner walls 134 of the heater housings to the air outlets 184, and so the flow directions of these portions of the primary air flow are also reversed within the interior passage. The air outlets 184 are arranged to direct the relatively hot, merged first and third portions of the primary air flow over the relatively cold second portion of the primary air flow emitted from the air outlets 158, which acts as a thermal barrier between the outer surface 92 of the inner casing section 90 and the relatively hot air emitted from the air outlets 184. Consequently, the majority of the internal and external surfaces of the nozzle 16 are shielded from the relatively hot air emitted from the fan assembly 10. This can enable the external surfaces of the nozzle 16 to be maintained at a temperature below 70° C. during use of the fan assembly 10.

The main control circuit 52 continues to monitor the detected magnitude of the current drawn by the heater assemblies 104. The magnitude of the current drawn by the heater assemblies is monitored at 0.5 second intervals. As air passes over the heating elements 106 of the heater assemblies 104, the current drawn by the heating assemblies 104 tends to increase from the inrush current. In the event that the detected magnitude of the inrush current was lower than $I_{max1}$, the main control circuit 52 increases the rotational speed of the motor 68 towards the highest value within the non-user selectable range of values for the rotational speed of the motor 68, as the detected magnitude of the current drawn by the heater assemblies 104 increases towards $I_{max1}$. During this first operational period of the main control circuit 52, any speed setting selected by the user is stored by the main control circuit 52 but not acted upon.

During the first operational period, the main control circuit monitors both the magnitude of the current drawn by the heater assemblies 104, and the rate of change of the magnitude of the current drawn by the heater assemblies 104. This first operational period of the main control circuit 52 is terminated when one of two conditions is met.

The first condition is that the rate of change of the magnitude of the current drawn by the heater assemblies 104 has fallen below a set value. As mentioned above, the current drawn by the heater assemblies 104 is detected every 0.5 seconds. The main control circuit 52 measures the change in the magnitude of the current drawn by the heater assemblies 104 between consecutive drawn current detections. In other words, the main control circuit 52 detects the change in the magnitude of the current drawn by the heater assemblies 104 between the first and the second drawn current detections, the change in the magnitude of the current drawn by the heater assemblies 104 between the second and the third drawn current detections, and so on. If the change in the magnitude of the current drawn by the heater assemblies 104 is below the set value for a predetermined number of consecutive measurements, the first condition is met. The magnitude of the set value and the number of consecutive measurements are selected depending on the supply voltage. For example, when the supply voltage is 100V or 120V, the set value is 0.2 A and the predetermined number of consecutive measurements is 20, whereas when the supply voltage is 230V or 240V, the set value is 0.15 A and the predetermined number of consecutive measurements is 14.

The second condition is that the magnitude of the current drawn by the heater assemblies 104 is above an upper current limit $I_{max2}$, which is the rated current for the heating apparatus and where $I_{max2} > I_{max1}$. The value of $I_{max2}$ is also set according to the supply voltage. For example, $I_{max2}$ is set at 8.9 A for a 240V supply voltage, 12.6 A for a 100V supply voltage, at 13.1 A for a 120V supply voltage, and at 9.1 A for a 230V supply voltage.

When either of the first condition and the second condition is met, the first operational period is terminated and the main control circuit 52 enters a second operational period. At the start of this second operational period, the main control circuit 52 selects the rotational speed of the motor from one of a plurality of second ranges of values for the rotational speed of the motor. In this example, the main control circuit 52 selects the rotational speed of the motor from one of eight second ranges of values for the rotational speed of the motor, as set out in the following table.

| Speed setting | Second speed range 8 (rpm) | Second speed range 7 (rpm) | Second speed range 6 (rpm) | Second speed range 5 (rpm) | Second speed range 4 (rpm) | Second speed range 3 (rpm) | Second speed range 2 (rpm) | Second speed range 1 (rpm) |
|---|---|---|---|---|---|---|---|---|
| 10 | 6750 | 6600 | 6375 | 6150 | 5925 | 5700 | 5475 | 5250 |
| 9 | 6600 | 6400 | 6200 | 6000 | 5800 | 5600 | 5400 | 5200 |
| 8 | 6375 | 6200 | 6025 | 5850 | 5675 | 5500 | 5325 | 5150 |
| 7 | 6150 | 6000 | 5850 | 5700 | 5550 | 5400 | 5250 | 5100 |
| 6 | 5925 | 5800 | 5675 | 5550 | 5425 | 5300 | 5175 | 5050 |
| 5 | 5700 | 5600 | 5500 | 5400 | 5300 | 5200 | 5100 | 5000 |
| 4 | 5475 | 5400 | 5325 | 5250 | 5175 | 5100 | 5025 | 4950 |
| 3 | 5250 | 5200 | 5150 | 5100 | 5050 | 5000 | 4950 | 4900 |
| 2 | 5025 | 5000 | 4975 | 4950 | 4925 | 4900 | 4875 | 4850 |
| 1 | 4800 | 4800 | 4800 | 4800 | 4800 | 4800 | 4800 | 4800 |

At the start of the second operational period, the main control circuit 52 selects the rotational speed of the motor 68 according to the user selected speed setting from the highest second range of values, which in this example is second speed range 8. For example, if the user has selected speed setting 7, the motor is rotated at a speed of 6150 rpm at the start of the second operational period.

The main control circuit 52 continues to monitor the magnitude of the current drawn by the heater assemblies 104. During this second operational period, the duration between consecutive current detections is longer than the duration between consecutive current detections during the first operational mode, and is preferably set at 10 seconds, as opposed to 0.5 seconds during the first operational period.

During the second operational period, in the event that the detected magnitude of the current drawn by the heater assemblies 104 rises above the upper current limit, $I_{max2}$, the main control circuit 52 reduces the rotational speed of the motor 68 by selecting the rotational speed of the motor 68 from the next lowest second range of values, which in the current example is second speed range 7. For example, if the user has selected speed setting 7, the rotational speed of the motor 68 is reduced to 6,000 rpm. In the event that the detected current does not fall below the upper current limit, $I_{max2}$, the main control circuit 52 further reduces the rotational speed of the motor 68 by selecting the rotational speed of the motor 68 from the next lowest second range of values. This reduction in the rotational speed of the motor continues until the detected magnitude of the current drawn by the heater assemblies 104 has fallen below the upper current limit, $I_{max2}$.

In the event that a condition is reached where both the detected magnitude of the current drawn by the heater assemblies 104 is above the upper current limit and the rotational speed of the motor 68 is selected from the lowest second range of values, which in the current example is second speed range 1, the main control circuit 52 terminates activation of both the heater assemblies 104 and the motor 68, and issues a command to the user interface control circuit 33 to display an error message on the display 32.

On the other hand, in the event that the detected magnitude of the current drawn by the heater assemblies 104 falls below a lower current limit, $I_{min2}$, where $I_{min2} < I_{max2}$, following such a reduction in the rotational speed of the motor 68, the main control circuit 52 increases the rotational speed of the motor back towards the user selected value in order to increase the air flow rate through the heater assemblies 104, and thus potentially increase the power drawn by the fan assembly 10. The previous incremental decrease in the rotational speed of the motor 68 is reversed by selecting the rotational speed of the motor 68 from the next highest second range of values.

Provided that the detected magnitude of the current drawn by the heater assemblies 104 remains below the lower current limit, $I_{min2}$, this incremental increase in the rotational speed of the motor 68 continues until the rotational speed of the motor 68 is selected from the highest second range of values. The value of is also set according to the supply voltage. For example, $I_{min2}$ is set at 8.5 A for a 240V supply voltage, at 12.2 A for a 100V supply voltage, at 12.7 A for a 120V supply voltage and at 8.7 A for a 230V supply voltage.

As mentioned above, the main control circuit 52 includes a supply voltage sensing circuit 62 for detecting the magnitude of the voltage supplied to the fan assembly 10. In the event the detected magnitude of the supply voltage is below a lower voltage limit, and the detected magnitude of the current drawn by the heater assemblies 104 is below the set value monitored during the first operational period, the main control circuit 52 terminates the second operational period and enters a third operational period. Again, the lower voltage limit is set depending on the supply voltage, and is set at 180V for a 220V or a 240V supply voltage, and at 90V for a 100V or a 120V supply voltage. In this third operation period, the main control circuit 52 sets the rotational speed of the motor to one of the non-user selectable range of values for the rotational speed of the motor 68 depending on the detected magnitude of the current drawn by the heater assemblies 104. When the detected magnitude of the current drawn by the heater assemblies 104 rises above the set value, the main control circuit 52 re-commences the first operational period.

As the temperature of the air in the external environment increases, the temperature of the primary air flow drawn into the fan assembly 10 through the air inlet 14, $T_a$, also increases. A signal indicative of the temperature of this primary air flow is output from the thermistor 126 to the heater control circuit 122. When $T_a$ has risen to 1° C. above $T_s$, the heater control circuit 122 de-activates the heater assemblies 104 and the main control circuit 52 reduces the rotational speed of the motor 68 to 1,000 rpm. When the temperature of the primary air flow has fallen to a temperature around 1° C. below $T_s$, the heater control circuit 122 re-activates the heater assemblies 104 and the main control circuit 52 re-commences the first operational period. This can allow a relatively constant temperature to be maintained in the room or other environment in which the fan assembly 10 is located.

The invention claimed is:

1. A fan assembly comprising:
   an air inlet;
   at least one air outlet;
   an impeller and a motor for rotating the impeller to draw air through the air inlet;
   at least one heater assembly;
   a user interface for allowing a user to select a speed setting for the motor from a single, user selectable range of speed settings, and for allowing a user to select one of a first operational mode of the fan assembly and a second operational mode of the fan assembly, wherein the first operational mode of the fan assembly is a fan mode during which the at least one heater assembly is not actuated and the second operational mode of the fan assembly is a heater mode during which the at least one heater assembly is actuated;
   a current detector configured to detect a magnitude of a current drawn by the at least one heater assembly; and
   a controller for setting a rotational speed of the motor;
   wherein the controller is configured to select the rotational speed of the motor from a first range of values in the first operational mode of the fan assembly, from at least one second range of values independently from the user selected speed setting depending on the magnitude of the current detected during a first operational period in the second operational mode of the fan assembly, and from at least one third range of values depending on at least the user selected speed setting during a second operational period in the second operational mode of the fan assembly, and wherein, within each of the first and third range of values, each value is associated with a respective one of the user selectable speed settings and the first range of values has a maximum value which is higher than the values of each of the at least one third range of values.

2. The fan assembly of claim 1, wherein each of the first and third range of values has a maximum value and a minimum value, and wherein each of the range of values has a different respective maximum value.

3. The fan assembly of claim 1, wherein the user interface is configured to display continuously the selected operational mode of the fan assembly.

4. The fan assembly of claim 1, wherein the maximum value of the first range of values is at least 1,000 rpm higher than the maximum value of each of the at least one third range of values.

5. The fan assembly of claim 1, wherein the number of user selectable speed settings is at least five.

6. The fan assembly of claim 1, wherein the minimum value of the first range of values is the same as the minimum value for the third range of values.

7. The fan assembly of claim 1, comprising a temperature detector for detecting a temperature which is indicative of the temperature of the environment in which the fan assembly is located, and wherein the user interface is configured to allow a user to select a temperature setting from a user selectable range of temperature settings, and wherein the controller is configured to, in the heater mode, actuate the at least one heater assembly depending on a difference between the detected temperature and the selected temperature.

8. The fan assembly of claim 2, wherein each of the first and third range of values has the same minimum value.

9. The fan assembly of claim 7, wherein the controller is configured to, in the heater mode, vary the rotational speed of the motor away from the selected rotational speed depending on a state of the at least one heater assembly.

10. The fan assembly of claim 7, wherein the controller is configured to select the rotational speed of the motor from the first range of values when the user has selected a minimum temperature setting from the user selectable range of temperature settings, and from at least one third range of values when the user has selected a temperature setting other than the minimum temperature setting from the user selectable range of temperature settings.

11. The fan assembly of claim 9, wherein the controller is configured to, in the heater mode, reduce the rotational speed of the motor to a set value depending on a state of the at least one heater assembly.

12. The fan assembly of claim 11, wherein the set value is lower than each of the first and third range of values.

* * * * *